US008643640B2

(12) United States Patent
Imamura

(10) Patent No.: US 8,643,640 B2
(45) Date of Patent: Feb. 4, 2014

(54) OBJECT PROCESSING APPARATUS AND STORAGE MEDIUM HAVING OBJECT PROCESSING PROGRAM STORED THEREON

(75) Inventor: Takaya Imamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1947 days.

(21) Appl. No.: 11/592,248

(22) Filed: Nov. 3, 2006

(65) Prior Publication Data

US 2007/0257907 A1    Nov. 8, 2007

(30) Foreign Application Priority Data

May 8, 2006 (JP) ................................. 2006-129368

(51) Int. Cl.
*G06T 15/00* (2011.01)
(52) U.S. Cl.
USPC ........................................................... 345/419
(58) Field of Classification Search
USPC ...................................... 345/419; 463/31–34
See application file for complete search history.

(56) References Cited

U.S. PATENT DOCUMENTS

| 4,698,460 | A | * | 10/1987 | Krein et al. ................... 345/173 |
| 2002/0118168 | A1 | | 8/2002 | Hinckley et al. |
| 2003/0222856 | A1 | | 12/2003 | Fedorak et al. |
| 2006/0019752 | A1 | | 1/2006 | Ohta |
| 2006/0019753 | A1 | | 1/2006 | Ohta |
| 2006/0052165 | A1 | | 3/2006 | Ohta |
| 2006/0052166 | A1 | | 3/2006 | Ohta |

FOREIGN PATENT DOCUMENTS

| EP | 0 919 907 | | 6/1999 |
| EP | 0 762 264 | | 2/2002 |
| EP | 1 652 562 | | 5/2006 |
| JP | 7-182092 | | 7/1995 |
| JP | 11-53115 | | 2/1999 |
| JP | 11-175212 | * | 7/1999 |
| JP | 2006-34516 | | 2/2006 |

OTHER PUBLICATIONS

Translation of JP 11-175212 on Oct. 23, 2009 by JPO website, pp. 1-21.*

* cited by examiner

*Primary Examiner* — Jeffery A Brier
(74) *Attorney, Agent, or Firm* — Nixon & Vanderhye P.C.

(57) ABSTRACT

An operation region is defined as being divided into at least two types of areas of a first area and a second area bordering on the first area. An indicated coordinate set is detected, and it is determined whether the indicated coordinate set is encompassed in the first area or the second area. When the indicated coordinate set is encompassed in the first area, the indicated coordinate set is set as the reference coordinate set. When the indicated coordinate set is encompassed in the second area, a predetermined coordinate set closer to the first area than the indicated coordinate set is set as the reference coordinate set. Based on the positional relationship between the reference coordinate set and the indicated coordinate set, an operation on an object in a virtual space is controlled.

22 Claims, 31 Drawing Sheets

F I G. 2 4
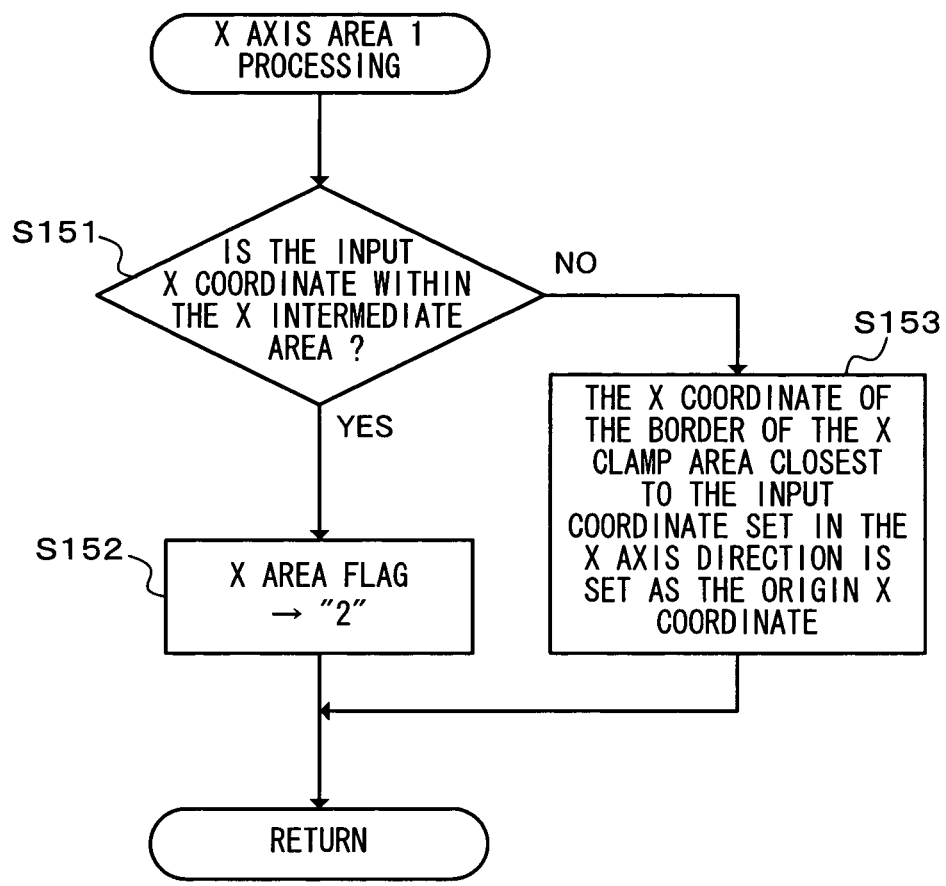

OBJECT PROCESSING APPARATUS AND STORAGE MEDIUM HAVING OBJECT PROCESSING PROGRAM STORED THEREON

CROSS REFERENCE TO RELATED APPLICATION

The disclosure of Japanese Patent Application No. 2006-129368, filed on May 8, 2006, is incorporated herein by reference.

TECHNICAL FIELD

Certain exemplary embodiments described herein relate to an object processing apparatus and a storage medium having an object processing program stored thereon, and more specifically to an object processing apparatus for executing processing on an object in a virtual space based on an indicated coordinate set corresponding to a position in an operation region indicated by a player, and a storage medium having stored thereon an object processing program for executing such processing.

BACKGROUND AND SUMMARY

Conventionally, input devices and game apparatuses operable by a player using a pointing device such as a touch panel or the like (for example, Japanese Laid-Open Patent Publications Nos. 11-53115, 7-182092, and 2006-34516) have been developed. With the input device disclosed in Japanese Laid-Open Patent Publication No. 11-53115, the player uses a touch panel such that the cursor is moved in the moving direction and at the moving speed which are determined based on the direction and the distance of a pointed position with respect to the origin predetermined on the touch panel. With the input device disclosed in Japanese Laid-Open Patent Publication No. 7-182092, the player selects an operation target by a touch operation on the game screen of the touch panel and moves the operation target in correspondence with the vector amount representing the movement of the player's finger on the touch panel. The game program disclosed in Japanese Laid-Open Patent Publication No. 2006-34516 moves the origin, determined by touch input, as being attracted to the indicated point in accordance with the moving direction of the player's finger on the touch panel.

The devices and game programs as described above have the following problems. With the device disclosed in Japanese Laid-Open Patent Publication No. 11-53115, the origin is predetermined on the touch panel. Therefore, for example, in a game in which the operation target is an automobile, an airplane or the like, even though the player wishes to make the object proceed straight, the proceeding direction is shifted if the input position is slightly offset from the origin. In addition, the origin cannot be felt by the finger. Therefore, the player needs to perform the operation while visually checking the position of the origin. This reduces the operability in an application such as a game which requires a quick operation. The player cannot fully enjoy the game.

Japanese Laid-Open Patent Publication No. 7-182092 discloses a system by which an object which is touched and thus selected is moved on the game screen in correspondence with the vector representing the movement of the player's finger. Unless the player's finger moves, no information is input. In order to move an object, the player needs to keep on moving his/her finger, which may reduce the operability in certain types of games.

With the device disclosed in Japanese Laid-Open Patent Publication No. 2006-34516, in a game in which the operation target is an automobile, an airplane or the like, when the player wishes to perform an operation of moving the object by a large amount, for example, of rapidly turning the steering wheel to change the proceeding direction to the right, the player needs to first touch a central position of the touch panel and then largely moves his/her finger rightward. This reduces the operability in certain types of games.

Therefore, a feature of certain exemplary embodiments is to provide an object processing apparatus with a higher operability for improving the operation responsiveness when processing an object in a virtual space by indicating a position in an operation region, and a storage medium having stored thereon an object processing program for executing such processing.

Certain exemplary embodiments herein have the following features to attain the feature mentioned above. The reference numerals, additional explanations and the like in parentheses in this section of the specification indicate the correspondence with certain exemplary embodiments described later for easier understanding and are not intended to be limiting in any way.

A first aspect of the certain exemplary embodiments is directed to an object processing apparatus (10) for executing processing on an object (101) in a virtual space based on an indicated coordinate set corresponding to a position in an operation region (102) indicated by a player (a point on the operation region 102 indicated by the stylus pen 17). The object processing apparatus comprises an indicated coordinate set detection section (31), an indicated coordinate set determination section (31), a reference coordinate set setting section (31), and an operation control section (31). The operation region is defined as being divided into at least two types of areas of a first area and a second area bordering on the first area. The indicated coordinate set detection section detects the indicated coordinate set. The indicated coordinate set determination section determines whether the indicated coordinate set is encompassed in the first area or the second area. When the indicated coordinate set is determined to be encompassed in the first area, the reference coordinate set setting section sets the indicated coordinate set as a reference coordinate set, and when the indicated coordinate set is determined to be encompassed in the second area, the reference coordinate set setting section sets a predetermined coordinate set closer to the first area than the indicated coordinate set as the reference coordinate set. The operation control section controls an operation on the object in the virtual space based on a positional relationship between the reference coordinate set and the indicated coordinate set.

In a second aspect based on the first aspect, the operation control section controls an operation on the object based on at least one of a direction and a distance both determined by the positional relationship between the reference coordinate set and the indicated coordinate set.

In a third aspect based on the second aspect, the operation control section controls a moving direction of the object to be a direction determined by the positional relationship between the reference coordinate set and the indicated coordinate set.

In a fourth aspect based on the second aspect, the operation control section controls a moving speed of the object based on a moving speed in accordance with the distance determined by the positional relationship between the reference coordinate set and the indicated coordinate set.

In a fifth aspect based on the first aspect, when the indicated coordinate set is determined to be encompassed in the second area, the reference coordinate set setting section sets a coordinate set among coordinate sets on a border between the first area and the second area as the reference coordinate set.

In a sixth aspect based on the fifth aspect, the reference coordinate set setting section sets a coordinate set among the coordinate sets on the border which is closest to the indicated coordinate set as the reference coordinate set.

In a seventh aspect based on the first aspect, the first area encompasses a central area of the operation region.

In an eighth aspect based on the first aspect, in the case where indicated coordinate sets are continuously detected by the indicated coordinate set detection section as time passes after the reference coordinate set is set by the reference coordinate set setting section, the reference coordinate set setting section sets a reference coordinate set which is set at the start of the time duration in which the indicated coordinate sets are continuously detected as a new reference coordinate set, regardless of the determination result by the indicated coordinate set determination section.

In a ninth aspect based on the first aspect, in the case where indicated coordinate sets are continuously detected by the indicated coordinate set detection section as time passes after the reference coordinate set is set by the reference coordinate set setting section, when the indicated coordinate set is encompassed in the first area, the reference coordinate set setting section does not change the position of the reference coordinate set, and when the indicated coordinate set is encompassed in the second area, the reference coordinate set setting section sets a predetermined coordinate set closer to the first area than the indicated coordinate set as the reference coordinate set.

In a tenth aspect based on the ninth aspect, the operation region is defined as including a third area encompassing the first area. In the case where indicated coordinate sets are continuously detected by the indicated coordinate set detection section as time passes after the reference coordinate set is set by the reference coordinate set setting section, the indicated coordinate set determination section further determines whether or not the indicated coordinate set has gone outside the third area. When the indicated coordinate set is determined not to have gone outside the third area, the reference coordinate set setting section does not change the position of the reference coordinate set, and when the indicated coordinate set is determined to have gone outside the third area, the reference coordinate set setting section sets the predetermined coordinate set closer to the first area than the indicated coordinate set as the reference coordinate set.

In an eleventh aspect based on the first aspect, the second area is defined as encompassing a fourth area bordering on the first area. The object processing apparatus further comprises a reference coordinate set moving section (31) for, when the reference coordinate set is encompassed in the fourth area and indicated coordinate sets are continuously detected by the indicated coordinate set detection section as time passes, changing the position of the reference coordinate set such that the reference coordinate set becomes gradually closer toward the center of the operation region as time passes.

A twelfth aspect of the certain exemplary embodiments is directed to a storage medium having stored thereon an object processing program executable by a computer of an object processing apparatus for executing processing on an object in a virtual space based on an indicated coordinate set corresponding to a position in an operation region indicated by a player. The object processing program causes the computer to execute an indicated coordinate set detection step (S21, S31), an indicated coordinate set determination step (S22, S32), a reference coordinate set setting step (S24, S26, S34, S36), and an operation control step (S10). The operation region is defined as being divided into at least two types of areas of a first area and a second area bordering on the first area. The indicated coordinate set detection step detects the indicated coordinate set. The indicated coordinate set determination step determines whether the indicated coordinate set is encompassed in the first area or the second area. When the indicated coordinate set is determined to be encompassed in the first area, the reference coordinate set setting step sets the indicated coordinate set as a reference coordinate set, and when the indicated coordinate set is determined to be encompassed in the second area, the reference coordinate set setting step sets a predetermined coordinate set closer to the first area than the indicated coordinate set as the reference coordinate set. The operation control step controls an operation on the object in the virtual space based on a positional relationship between the reference coordinate set and the indicated coordinate set.

In a thirteenth aspect based on the twelfth aspect, the operation control step controls an operation on the object based on at least one of a direction and a distance both determined by the positional relationship between the reference coordinate set and the indicated coordinate set.

In a fourteenth aspect based on the thirteenth aspect, the operation control step controls a moving direction of the object to be a direction determined by the positional relationship between the reference coordinate set and the indicated coordinate set.

In a fifteenth aspect based on the thirteenth aspect, the operation control step controls a moving speed of the object based on a moving speed in accordance with the distance determined by the positional relationship between the reference coordinate set and the indicated coordinate set.

In a sixteenth aspect based on the twelfth aspect, when the indicated coordinate set is determined to be encompassed in the second area, the reference coordinate set setting step sets a coordinate set among coordinate sets on a border between the first area and the second area as the reference coordinate set.

In a seventeenth aspect based on the sixteenth aspect, the reference coordinate set setting step sets a coordinate set among the coordinate sets on the border which is closest to the indicated coordinate set as the reference coordinate set.

In an eighteenth aspect based on the twelfth aspect, the first area encompasses a central area of the operation region.

In a nineteenth aspect based on the twelfth aspect, in the case where indicated coordinate sets are continuously detected by the indicated coordinate set detection step as time passes after the reference coordinate set is set by the reference coordinate set setting step, the reference coordinate set setting step sets a reference coordinate set which is set at the start of the time duration in which the indicated coordinate sets are continuously detected as a new reference coordinate set, regardless of the determination result by the indicated coordinate set determination step.

In a twentieth aspect based on the twelfth aspect, in the case where indicated coordinate sets are continuously detected by the indicated coordinate set detection step as time passes after the reference coordinate set is set by the reference coordinate set setting step, when the indicated coordinate set is encompassed in the first area, the reference coordinate set setting step does not change the position of the reference coordinate set, and when the indicated coordinate set is encompassed in the second area, the reference coordinate set setting step sets a predetermined coordinate set closer to the first area than the indicated coordinate set as the reference coordinate set.

In a twenty-first aspect based on the twentieth aspect, the operation region is defined as including a third area encompassing the first area. In the case where indicated coordinate sets are continuously detected by the indicated coordinate set detection step as time passes after the reference coordinate set is set by the reference coordinate set setting step, the indicated coordinate set determination step further determines whether or not the indicated coordinate set has gone outside the third area. When the indicated coordinate is determined not to have gone outside the third area, the reference coordinate set setting step does not change the position of the reference coordinate set, and when the indicated coordinate set is determined to have gone outside the third area, the reference coordinate set setting step sets the predetermined coordinate set closer to the first area than the indicated coordinate set as the reference coordinate set.

In a twenty-second aspect based on the twelfth aspect, the second area is defined as encompassing a fourth area bordering on the first area. The object processing program causes the computer to further execute a reference coordinate set moving step (S167, S207) of, when the reference coordinate set is encompassed in the fourth area and indicated coordinate sets are continuously detected by the indicated coordinate set detection step as time passes, changing the position of the reference coordinate set such that the reference coordinate set becomes gradually closer toward the center of the operation region as time passes.

According to the first aspect, an operation result, which would be obtained when the indicated position is moved by a certain distance, can be obtained merely by indicating a position in the second area. When a position in the first area is indicated, an input result providing a moving amount of 0 can be obtained. When, for example, moving an object in accordance with the input result, an operation of moving the object by a large amount can be easily performed merely by indicating a position in the second area. In the first area, an input result providing a moving amount of 0 can be obtained. Therefore, even when the coordinate set information is slightly shifted due to the instability of the position of the hand or the like, such a shift can be ignored. This is a stark difference from the case where the origin is fixed to a predetermined point in the operation region. According to the first aspect, an operation of moving an object by a large amount and an operation of providing a moving amount of 0 can be both performed in an easy and intuitive manner, and thus the operability is improved.

According to the second through fourth aspects, the player can operate an object in an intuitive manner with a high operability.

According to the fifth aspect, substantially the same effects as those of the first aspect are provided.

According to the sixth aspect, the origin is set on the border closest to the input coordinate set. When, for example, performing an operation of returning a steering wheel rightward which had once been turned leftward, the amount of moving the indicated position in the opposite direction can be reduced. The operation responsiveness can be improved and the operability is enhanced.

According to the seventh aspect, the first area is in a central area. Thus, the operation can be performed in a manner closely matched to the sense of humans.

According to the eighth aspect, the reference coordinate set, once determined, is not changed in the subsequent continuous operation. Therefore, an operation can be performed in a relative coordinate system centering on the reference coordinate set, regardless of the reference position in the absolute coordinate system representing the operation region. Thus, the operation is performed in a manner closely matched to the sense of humans.

According to the ninth aspect, when the indicated position is in the first area, the reference coordinate set is not moved. Even when the indicated position is slightly shifted, such a shift can be ignored. Thus, a so-called "play" is provided. By contrast, when performing an operation of moving an object in the opposite direction by a large amount, the moving amount of the indicated position can be reduced. Thus, the operability is improved.

According to the tenth aspect, when the indicated position is in the third area, the reference coordinate set is not moved. Therefore, the so-called "play" is provided like in the ninth aspect. By contrast, when performing an operation of moving an object in the opposite direction by a large amount, the moving amount of the indicated position can be reduced. Thus, the operability is improved.

According to the eleventh aspect, the reference coordinate set is moved as time passes. Even when the player indicates a position off the center of the operation region, the reference coordinate set can be gradually moved toward the center. As a result, as time passes, the operation is gradually matched to the sense of humans. Thus, the operability is further improved.

A storage medium having stored thereon an object processing program according to certain exemplary embodiments provides substantially the same effects as the above-described effects of the game apparatus according to certain exemplary embodiments.

These and other features, aspects and advantages of certain exemplary embodiments will become more apparent from the following detailed description when taken in conjunction with the accompanying drawings.

BRIEF DESCRIPTION OF THE DRAWINGS

FIG. 24 is a flowchart illustrating X axis area 1 processing in step S142 in FIG. 23;

DETAILED DESCRIPTION

Hereinafter, certain exemplary embodiments will be described with reference to the drawings. The following exemplary embodiments do not limit the certain exemplary embodiments described herein in any way.

First Exemplary Embodiment

Figure 1:
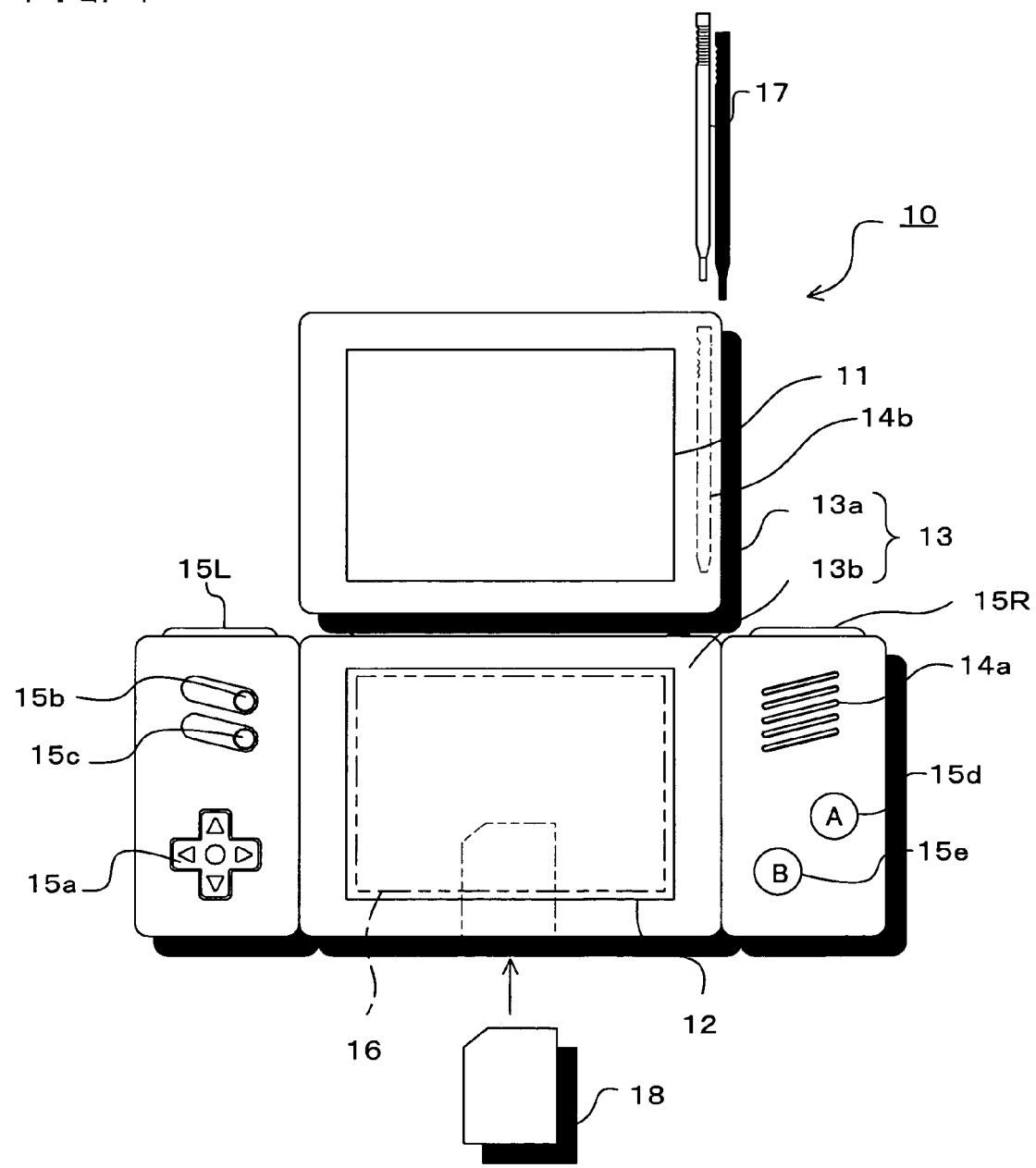
FIG. 1 is an external view of a mobile game apparatus 10 according to a first exemplary embodiment.

FIG. 1 is an external view of a mobile game apparatus 10 according to a first exemplary embodiment. As shown in FIG. 1, the game apparatus 10 in this exemplary embodiment includes two liquid crystal displays (LCDs) 11 and 12 which are accommodated in a housing 13 at predetermined positions. Specifically, in the case where the LCD 11 (first LCD) and the LCD 12 (second LCD) are accommodated in a vertically stacking manner, the housing 13 includes an upper housing 13a and a lower housing 13b. The upper housing 13a is pivotably supported by a part of an upper surface of the lower housing 13b. The upper housing 13a has a planar shape slightly larger than a planar shape of the first LCD 11, and has an opening for exposing a display screen of the first LCD 11 on one main surface thereof. The lower housing 13b has a planar shape longer in the horizontal direction than the planar shape of the upper housing 13a, and has an opening for exposing a display screen of the second LCD 12 at approximately the center of the lower housing 13b in the horizontal direction. One of two side sections of the lower housing 13b interposing the second LCD 12 has speaker holes 14a, and each of the two side sections has an operation switch section 15.

The operation switch section 15 includes a direction instruction switch 15a, a start switch 15b, and a select switch 15c which are attached to one main surface of the side section of the lower housing 13b to the left of the second LCD 12 as seen in FIG. 1. The operation switch section 15 also includes motion switches 15d and 15e which are attached to one main surface of the side section of the lower housing 13b to the right of the second LCD 12 as seen in FIG. 1. The direction instruction switch 15a is used, for example, for instructing a moving direction of a player object (or a player character) operable by a player or for instructing a moving direction of a cursor. The motion switches 15d and 15e are used for inputting motions other than the instructions on directions, for example, for inputting an instruction to jump, punch, move a weapon, etc. in an action game, and for inputting an instruction to obtain an item or to select and determine a weapon or a command, etc. in a roll playing game (RPG) or a simulation RPG. When necessary, the lower housing 13b may further include an additional motion switch(es), or side surface switches 15L and 15R which are respectively provided on upper surfaces of the side sections of the lower housing 13b to the left and to the right of the second LCD 12.

On a front surface of the second LCD 12, a touch panel 16 is provided. The touch panel 16 is of, for example, any of a resistance film system, an optical (infrared) system, and a static capacitance coupling system. When a stylus pen 17 (or a finger) presses, moves on, or touches an upper surface of the touch panel 16, the coordinate position of the stylus pen 17 is detected and the coordinate data is output.

In the vicinity of a side surface of the upper housing 13a, an accommodation hole 14b is formed when necessary for accommodating the stylus pen 17 for operating the touch panel 16. The stylus pen 17 is accommodated in the accommodation hole 14b. In a part of one side surface of the lower housing 13b, a cartridge insertion section (represented by the thin two-dot chain line in FIG. 1) is formed, for detachably accepting a memory card 18 having a built-in memory (e.g., a ROM) which stores a game program. A part of the lower housing 13b inner to the cartridge insertion section has a built-in connecter (represented by reference numeral 33 in FIG. 2) to be electrically connected with the memory card 18. The lower housing 13b (or the upper housing 13a) accommodates an electronic circuit board (represented by reference numeral 30 in FIG. 2) having various electronic components such as a CPU and the like mounted thereon. The information storage medium for storing the game program is not limited to a nonvolatile semiconductor memory such as a ROM or a flash memory, and may be a CD-ROM, a DVD, or a similar optical disc-shaped storage medium.

Figure 2:
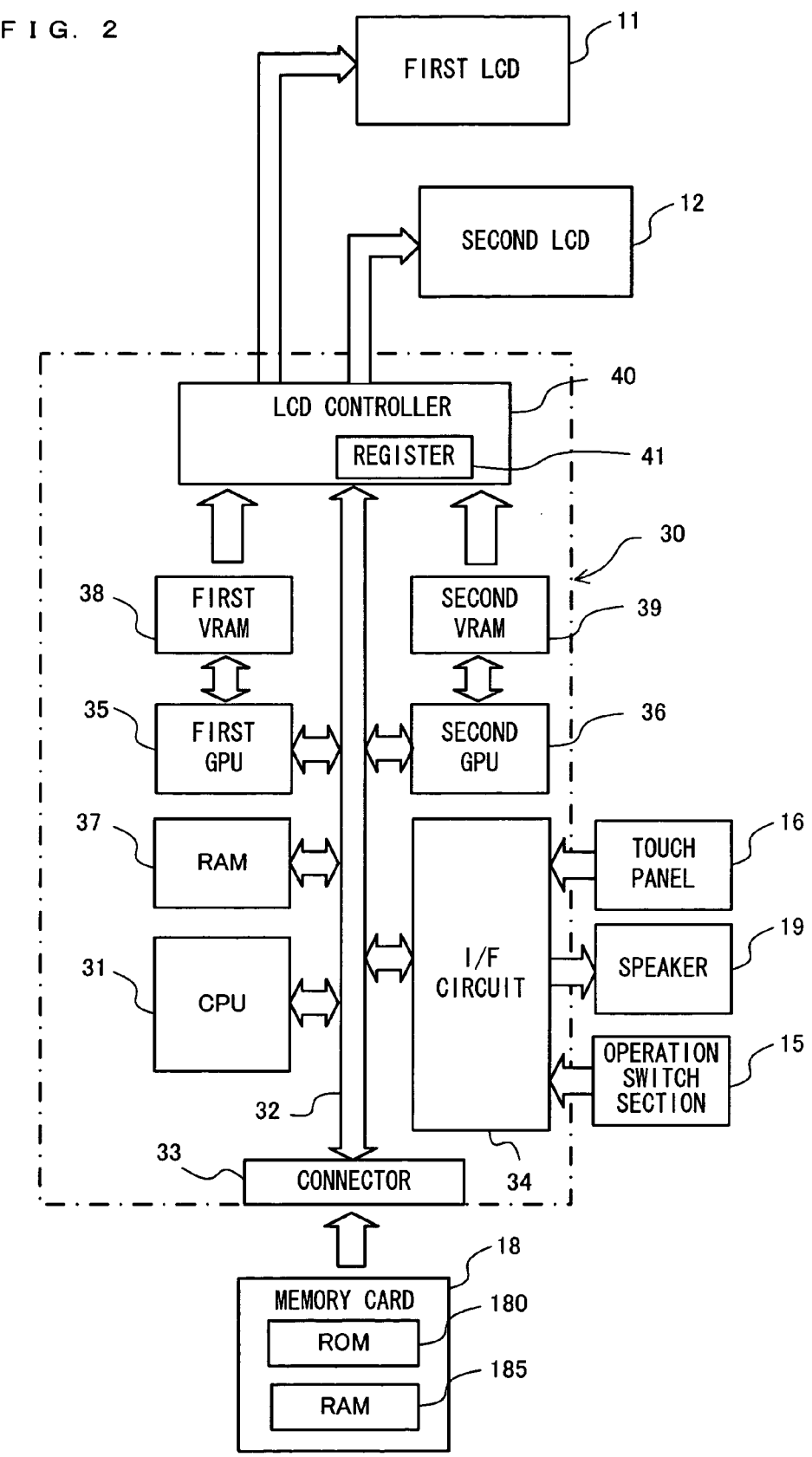
FIG. 2 is a block diagram of the mobile game apparatus 10 according to the first exemplary embodiment.

FIG. 2 is a block diagram of the mobile game apparatus 10. As shown in FIG. 2, the electronic circuit board 30 accommodated in the housing 13 has a CPU 31 mounted thereon. The CPU 31 is connected to the connector 33, an input/output interface (I/F) circuit 34, a first graphic processing unit (first GPU) 35, a second graphic processing unit (second GPU) 36, a RAM 37, and an LCD controller 40 via a bus 32. To the connecter 33, the memory card 18 is detachably connectable. As described above, the memory card is a storage medium for storing a game program. Specifically, the memory card 18 has a ROM 180 for storing the game program and a RAM 185 for rewritably storing backup data mounted thereon. The game program stored on the ROM 180 in the memory card 18 is loaded on the RAM 37, and the game program loaded on the RAM 37 is executed by the CPU 31. Temporary data and data for generating an image, which can be obtained by the CPU 31 through execution of the game program, are stored on the RAM 37. The I/F circuit 34 is connected to the operation switch section 15, the touch panel 16, and a speaker 19. The speaker 19 is located at a position inside the speaker holes 14a described above.

The first GPU 35 is connected to a first video RAM (hereinafter, referred to as the "first VRAM") 38, and the second GPU 36 is connected to a second video RAM (hereinafter, referred to as the "second VRAM") 39. In accordance with an instruction from the CPU 31, the first GPU 35 generates a first game image based on data for generating an image stored on the RAM 37, and draws the generated first game image on the first VRAM 38. In accordance with an instruction from the CPU 31, the second GPU 36 generates a second game image based on data for generating an image stored on the RAM 37, and draws the generated second game image on the second VRAM 39. The first VRAM 38 and the second VRAM 39 are connected to the LCD controller 40.

The LCD controller 40 includes a register 41. The register 41 stores the value of 0 or 1 in accordance with an instruction from the CPU 31. When the value of the register 41 is 0, the LCD controller 40 outputs the game image drawn on the first VRAM 38 to the first LCD 11 and outputs the game image drawn on the second VRAM 39 to the second LCD 12. When the value of the register 41 is 1, the LCD controller 40 outputs the game image drawn on the first VRAM 38 to the second LCD 12 and outputs the game image drawn on the second VRAM 39 to the first LCD 11.

The I/F circuit 34 passes data between external input and output devices including the operation switch section 15, the touch panel 16 and the speaker 19, and the CPU 31. The touch panel 16 (including a device driver for the touch panel) outputs data on a coordinate position corresponding to the position which is input (indicated) by the stylus pen 17. In this exemplary embodiment, the resolution of the display screen is 256 dots×192 dots, and the detection precision of the touch panel 16 is also 256 dots×192 dots in correspondence with the resolution of the display screen. The detection precision of the touch panel 16 may be lower or higher than the resolution of the display screen.

Figure 3:
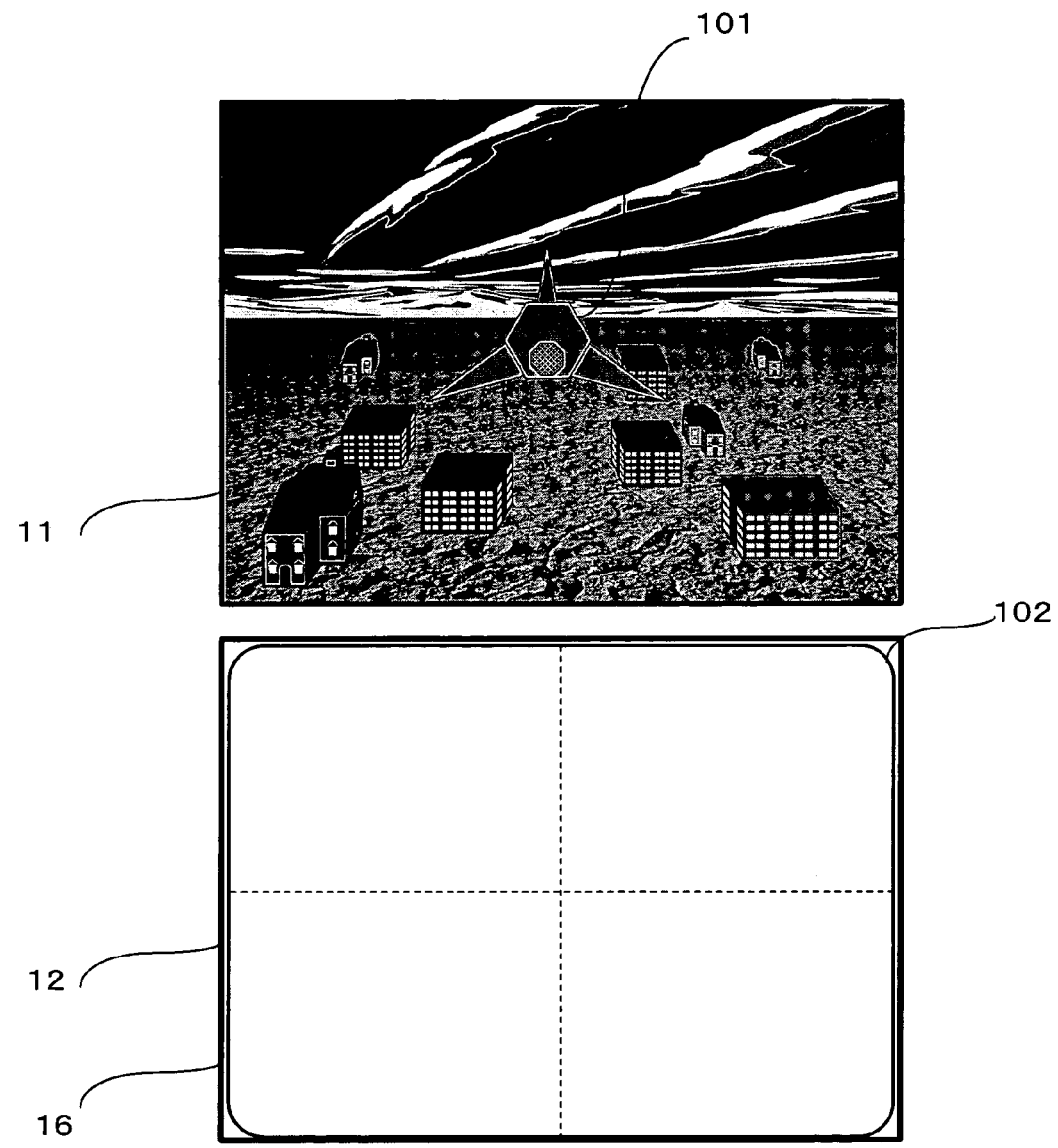
FIG. 3 shows an exemplary game screen of a game playable by the mobile game apparatus 10 according to the first exemplary embodiment.

With reference to FIG. 3 through FIG. 7, an overview of a game playable by the game apparatus 10 according to this exemplary embodiment will be described. FIG. 3 is an exemplary game screen in a game playable by the game apparatus 10 according to this exemplary embodiment. The game is a 3D shooting game. As shown in FIG. 3, the LCD 11 displays an airplane 101 as an operation target of the player. The LCD 12 may display an image of a map or an operation lever. The player can operate the airplane 101 by touching a screen of an operation region 102, which is an operation screen of the touch panel 16 provided on the LCD 102, with the stylus pen 17 and/or dragging (sliding) the stylus pen 17 on the touch panel 16. Specifically, when the player wishes to fly the airplane 101 leftward, the player touches a central area of the operation region 102 with the stylus pen 17 and then drags the stylus pen 17 leftward from the touch position (first operation method). In this way, the bow of the airplane 101 is directed leftward and the flying direction is changed to the left. Alternatively, the flying direction of the airplane 101 can be changed to the left merely by touching a left edge area outside the central area of the operation region 102 with the stylus pen 17 (second operation method). This is possible because when the player intentionally presses a left edge area of the touch panel 106, it is understood that the player wishes to change the flying direction to the left immediately.

Figure 4:
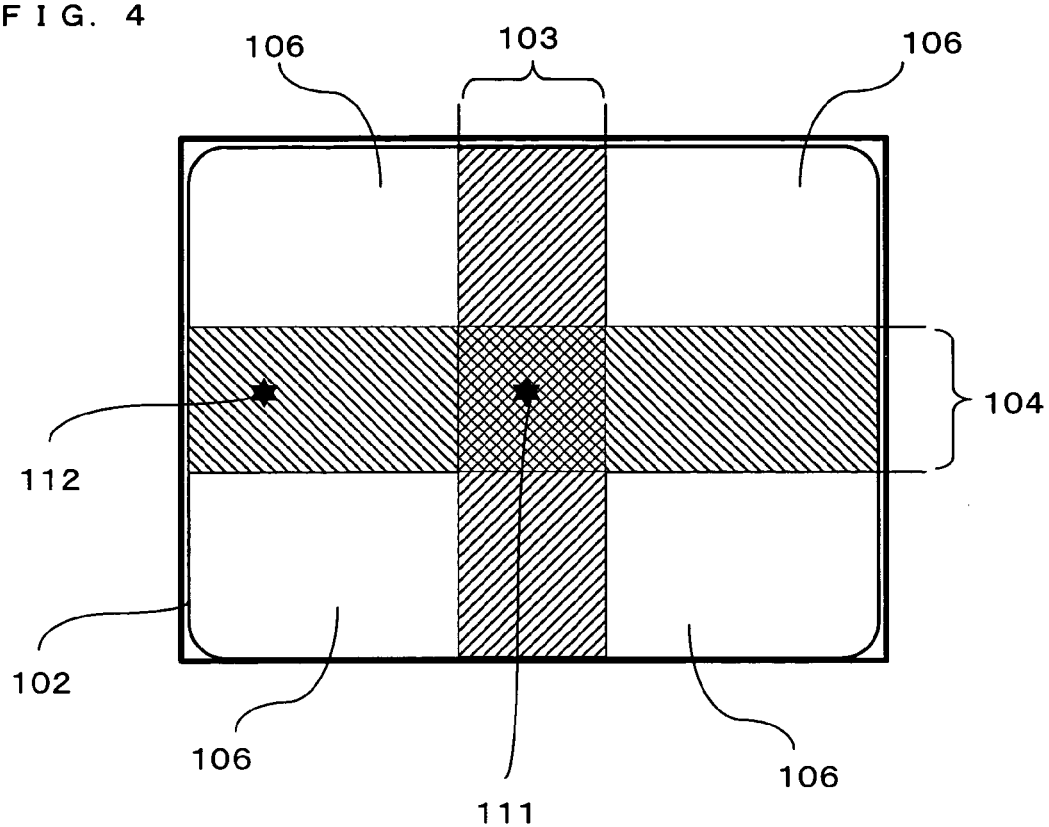
FIG. 4 shows an example of how an operation region 102 is divided into a plurality of areas in the first exemplary embodiment.

An overview of processing of the above-described operation will be described with reference to FIG. 4 through FIG. 7. In this exemplary embodiment, as shown in FIG. 4, the operation region 102 is divided into a plurality of areas. In other words, a coordinate set area of a coordinate system corresponding to the operation region 102 is defined as being divided into a plurality of areas. Such a definition is indicated by coordinate set range data described in the program in order to specify these areas. In accordance with the description of the coordinate set range data, indicated coordinate set determination processing (e.g., step S22 or S32) is executed. The definition of the areas may be stored separately from the program as table data, or made in advance by the hardware, instead of being described in the program. FIG. 4 shows X clamp area 103 including a central area of the operation region 102 in an X axis direction; a Y clamp area 104 including a central area of the operation region 102 in a Y axis direction; and out-of-clamp areas 106 other than the two clamp areas 103 and 104. For directing the airplane 101 leftward by the first operation method in the operation region 102 having such areas, the following processing is executed. (Here, for the sake of convenience, in the coordinate system representing the operation region 102, the central coordinate set is represented as (0, 0), and the areas leftward and downward from the central coordinate set are represented by negative numerals.) First, as shown in FIG. 4, the player performs touch-on (start of a touch input) with the stylus pen 17 at a point 111 in a central area of the operation region 102 (the area in which the X clamp area 103 and the Y clamp area 104 overlap each other). Then, the point 111 is set as the origin (reference coordinate set). Next, the player drags the stylus pen 17 to a point 112 near an edge of the operation region 102. Then, the difference between the point 111 as the origin and the point 112 is calculated as "−100 in the X axis direction and 0 in the Y axis direction (represented as (−100, 0))". Based on the difference, the direction from the origin to such an input coordinate set and the distance between the origin and the input coordinate set are calculated, and thus the flying direction of the airplane 101 is significantly changed (changed in the X axis direction by the amount of −100). In this way, the flying direction of the airplane 101 can be changed to the left.

Figure 5:
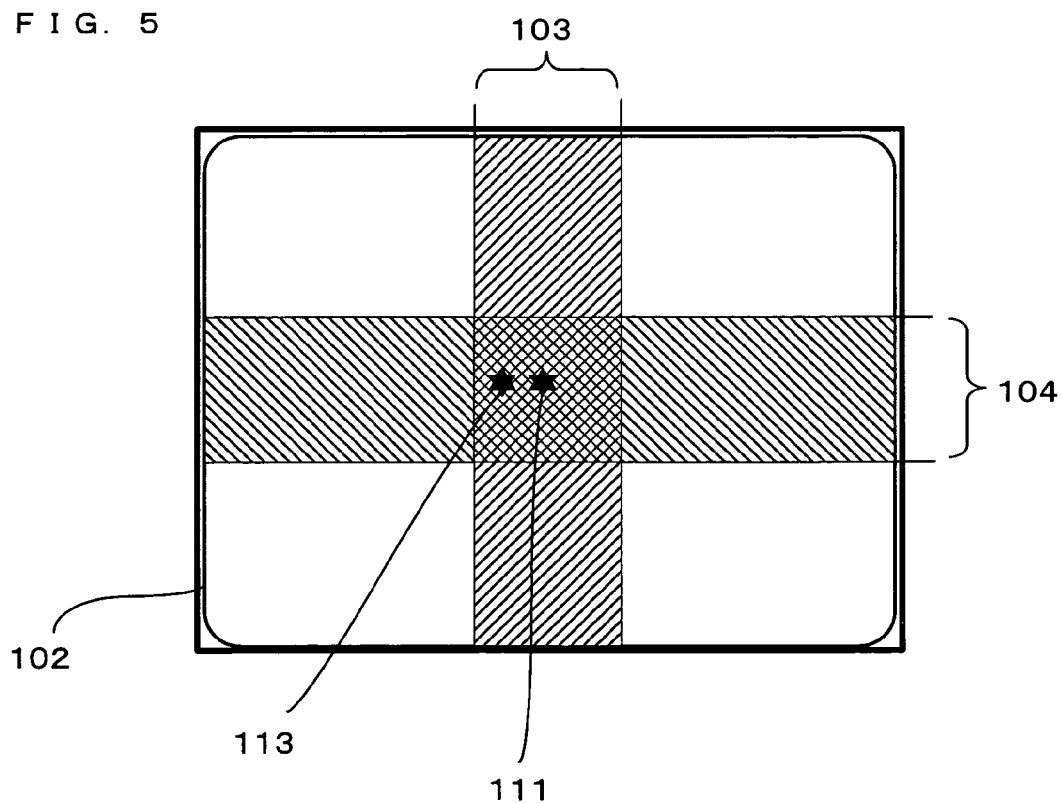
FIG. 5 shows an example of how a touch point is moved in the operation region 102.

When, as shown in FIG. 5, the player performs touch-on at the point 111 in the central area with the stylus pen 17 and then drags the stylus pen 17 to a point 113, the difference between the point 111 as the origin and the input point 113 is calculated as, for example, (−10, 0). Based on the difference, the flying direction of the airplane 101 is slightly changed to the left (changed by the amount of −10). In this case, the change amount is small and the flying direction of the airplane 101 is not largely changed. As a result, the airplane 101 keeps on flying substantially straight. In other words, when the stylus pen 17 is moved within the central area of the operation region 102, the flying direction of the airplane 101 is not significantly changed. When the stylus pen 17 is greatly moved from the central area toward an edge, the flying direction of the airplane 101 is significantly changed. Thus, the player can perform an operation in an analog-type manner as if he/she was using a joystick.

Figure 6:
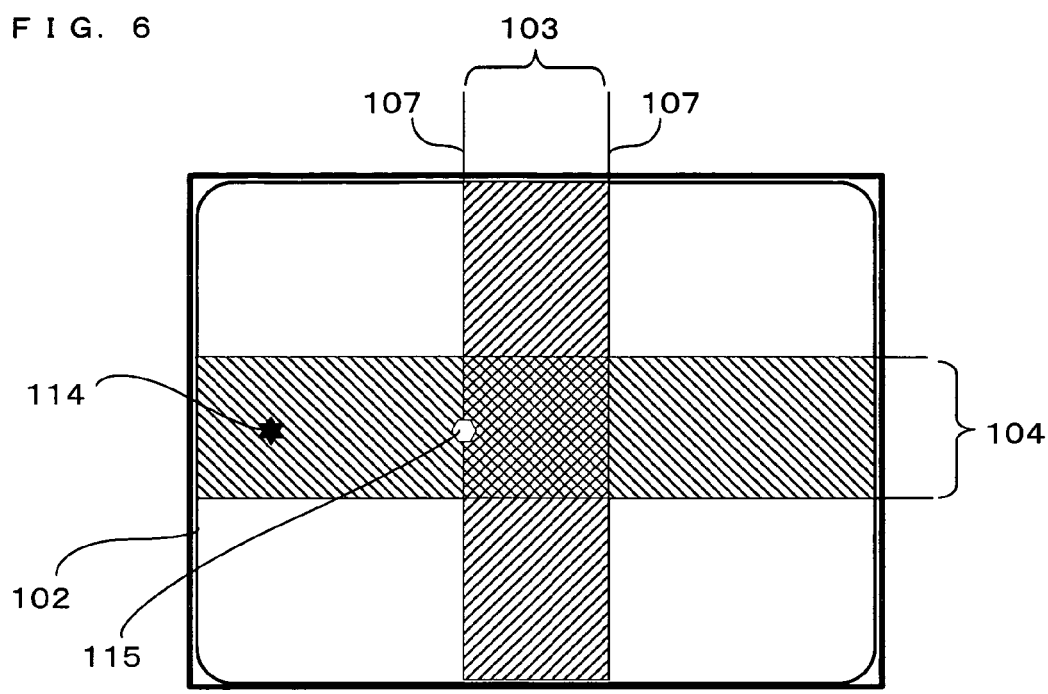
FIG. 6 shows a relationship between an input point and the origin in the operation region 102.
Figure 7:
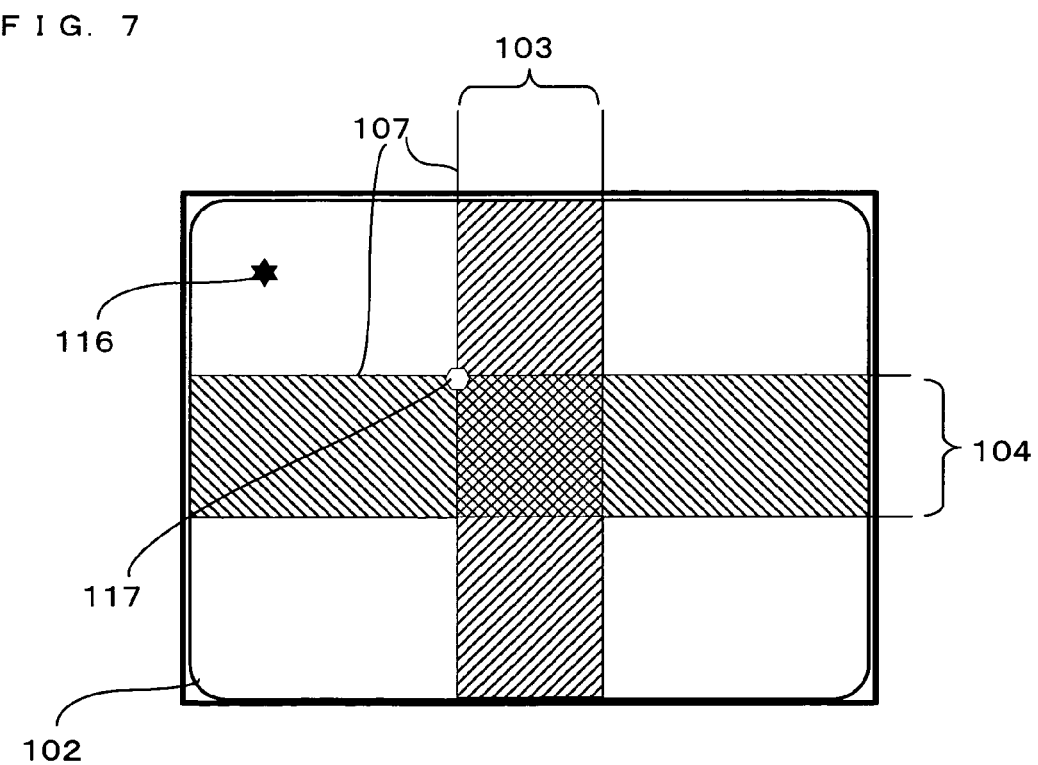
FIG. 7 shows a relationship between an input point and the origin in the operation region 102.

Next, an overview of processing of directing the airplane 101 leftward by the second operation method will be described. As shown in FIG. 6, the player performs touch-on at a point 114 near the left edge of the operation region 102, without touching the operation region 102 beforehand. The point 114 is outside the X clamp area 103. When a point outside a clamp area is touched, a point on the closest border in the X axis direction or the Y axis direction from the touch point is set as the origin. In the case of FIG. 6, the point 114 is outside the X clamp area 103, and thus the X coordinate on a border 107 of the X clamp area 103, which is closest to the point 114 in the X axis direction, is set as the X coordinate of the origin. Regarding the Y axis direction, the point 114 is within the Y clamp area 104, and thus the Y coordinate of the point 114 is used as the Y coordinate of the origin. As a result, a point 115 on the border 107, which is the closest border of the X clamp area 103 to the point 114 in the X axis direction, is set as the origin. The difference between the point 114 and the origin 115 is obtained. As a result, simultaneously when the touch-on is performed, a value of, for example, (−150, 0) is calculated as the difference. Based on the difference, the flying direction of the airplane 101 can be significantly changed to the left. Similarly, as shown in FIG. 7, when the player performs touch-on at a point 116 near the top left corner of the operation region 102, a point 117 on the border 107 of the X clamp area 103 and a border 107 of the Y clamp area 104, which are both closest to the point 117 in the X axis direction and the Y axis direction is set as the origin. As a result, a value of, for example, (−150, 150) is calculated as the difference. Based on the difference, the flying direction of the airplane 101 is significantly changed to the upper left.

As described above, the flying direction of the airplane 101 can be significantly changed by merely performing touch-on at a point near an edge of the operation region 102, as if the joystick was rapidly inclined. When touch-on is performed in the X clamp area 103, the X coordinate of the point at which the touch input is started (the point at the time of tough-on) is processed as the X coordinate of the origin. When touch-on is performed in the Y clamp area 104, the Y coordinate of the point at which the touch input is started is processed as the Y coordinate of the origin. Therefore, when the touch operation is kept while the stylus pen 17 is not significantly moved in the central area (where the X and Y clamp areas 103 and 104 overlap each other), precise operation control on the airplane 101 is possible.

Figure 8:
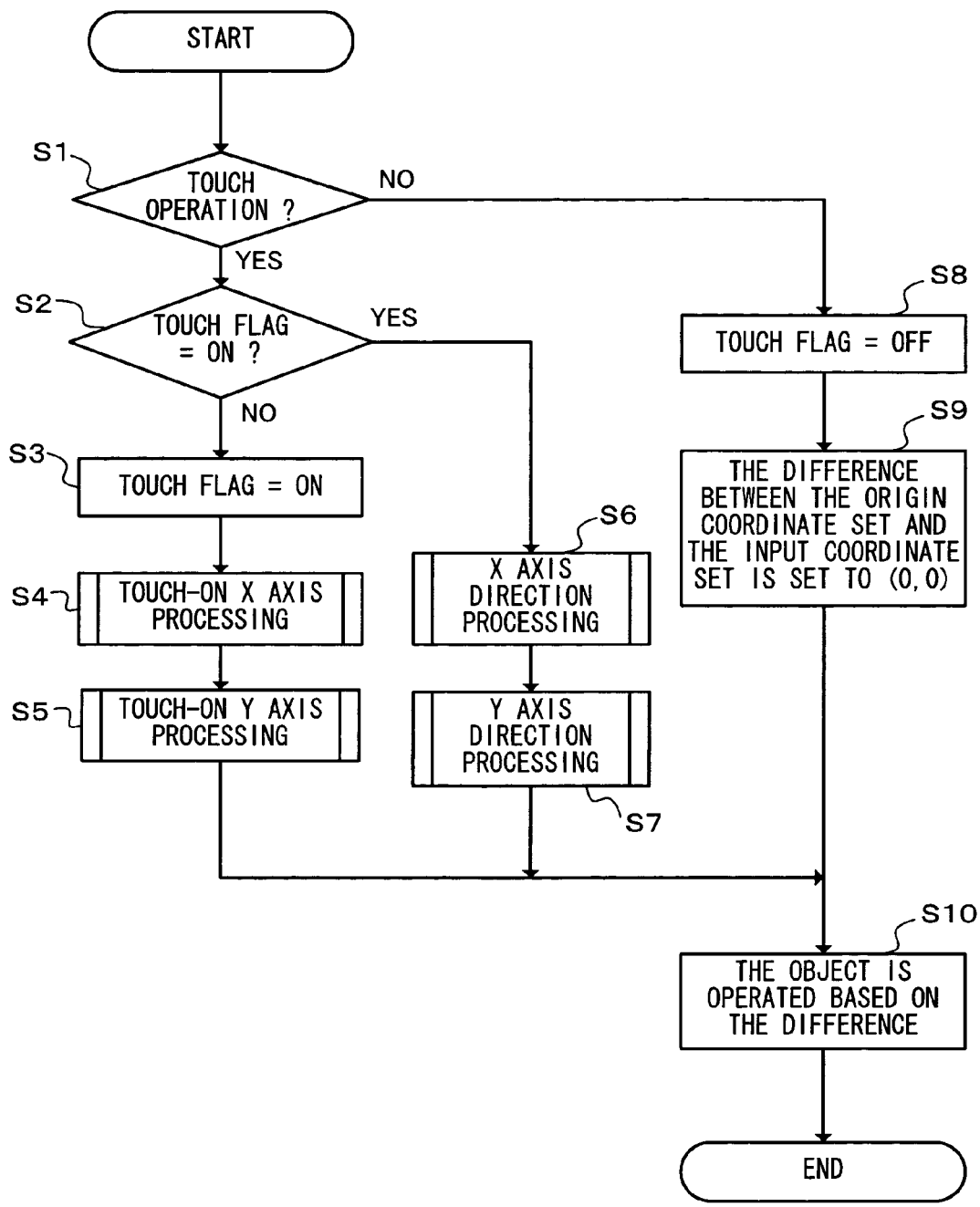
FIG. 8 is a flowchart illustrating a flow of game processing executed by the game apparatus 10 in the first exemplary embodiment.

Next, game processing executed by the game apparatus 10 will be described in detail with reference to FIG. 8 through FIG. 18. FIG. 8 is a flowchart illustrating a flow of the game processing executed by the game apparatus 10. When the game apparatus 10 is turned on, the CPU 31 of the game apparatus 10 executes a start program stored in a boot ROM (not shown) to initialize the elements including the RAM 37. The game program stored on the memory card 18 is read to the RAM 37, and thus the CPU 31 starts executing the game program. As a result, the game screens and the like are displayed on the first LCD 11 and the second LCD 12 (see FIG. 3). At this point, the operation region 102 is defined as being divided into a plurality of areas, i.e., the X clamp area 103 and other areas are defined as described above. The flowchart shown in FIG. 8 illustrates the game processing executed for performing an operation of moving the airplane 101 as an operation target of the player. In this exemplary embodiment, the processing other than the processing for this operation is not directly relevant to the exemplary embodiments described herein, and will not be described in detail. The processing loop of steps S1 through S10 shown in FIG. 8 is repeated for each frame.

Referring to FIG. 8, when a touch input is performed in the operation region 102 of the touch panel 16, data on the coordinate set of the position corresponding to the touch position is output from the touch panel 16 (including a device driver and the like for controlling the touch panel 16). The CPU 31 detects the output data from the touch panel 16 and thus determines whether or not the player has touched the operation region 102 (step S1). When it is determined in step S1 that the player has not touched the operation region 102 (NO in step S1), a touch flag is turned off (step S8). The touch flag indicates whether the touch panel 16 is touched by the player or the like (touch state) or not (non-touch state). Then, the difference between the coordinate set of the origin and the input coordinate set is made (0, 0) (step S9). The processing is advanced to step S10. By contrast, when it is determined in step S1 that the player has touched the operation region 102 (YES in step S1), the processing is advanced to step S2. In this exemplary embodiment, the processing is executed directly using the value of the coordinate set of the position which is output from the touch panel 16. Alternatively, the coordinate set of the position may be regulated within the range of −1 to 1 using the center of the operation region 102 as the origin and the after-regulation value may be used.

Next, the CPU 31 determines whether or not the player is at the start of the touch input on the touch panel (step S2). Namely, it is determined whether or not the non-touch state has just been changed to the touch state. More specifically, it is determined whether the touch flag is on or off. When the touch flag is on, the touch operation has been kept (YES in step S2). The processing is advanced to step S6. By contrast, when the touch flag is off, the player is at the start of the touch input (NO in step S2). Thus, the touch flag is turned on (step S3). Then, the processing is advanced to step S4 for touch-on X axis processing.

Figure 9:
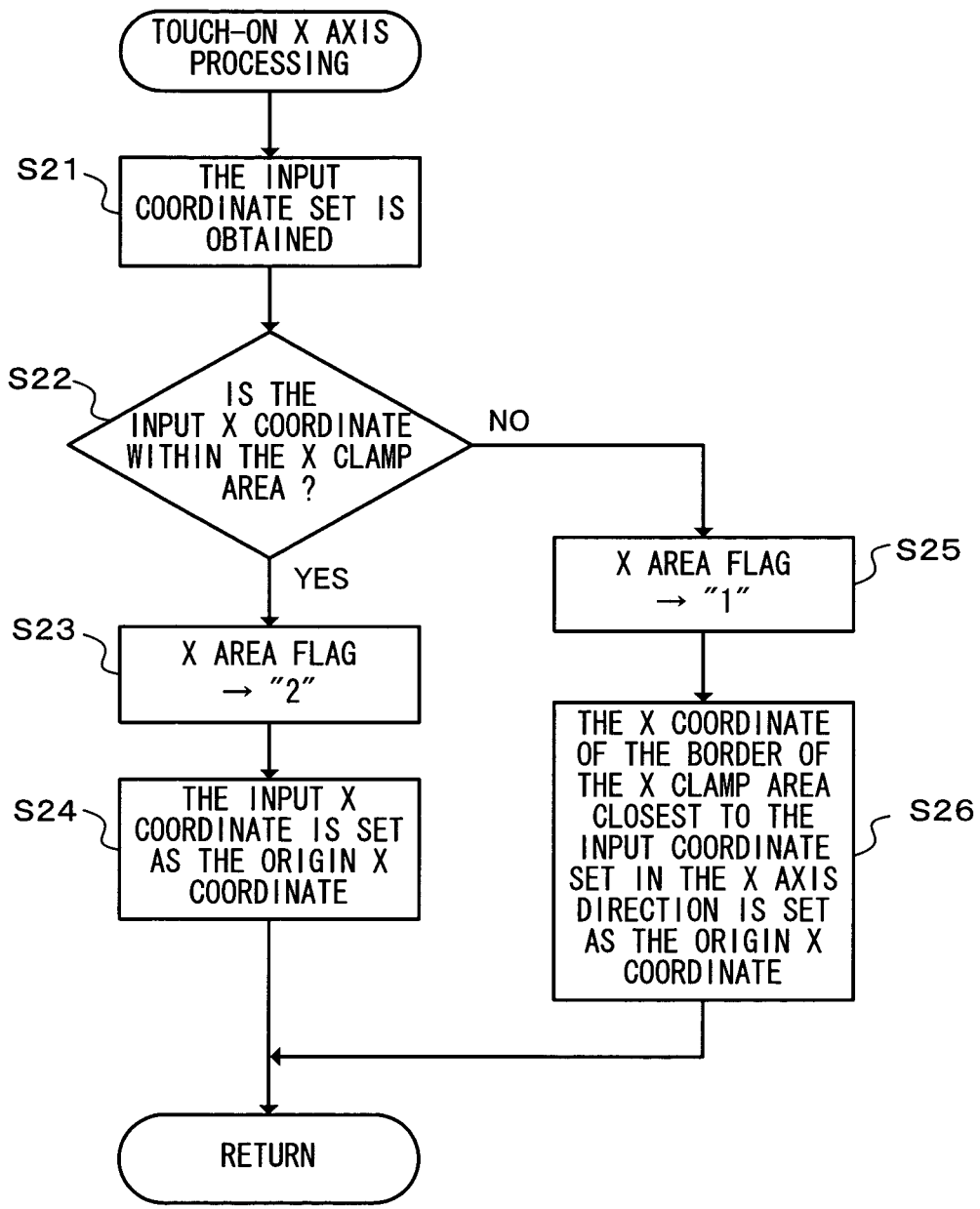
FIG. 9 is a flowchart illustrating touch-on X axis processing in step S4 in FIG. 8.

FIG. 9 is a flowchart illustrating the touch-on X axis processing in step S4 in detail. Referring to FIG. 9, the CPU 31 first obtains the coordinate set of the position which is output from the touch panel 16 (hereinafter, referred to as the "input coordinate set") (step S21). Next, the CPU 31 determines whether or not the X axis coordinate of the obtained input coordinate set (hereinafter, referred to as the "input X coordinate) is within the range of the X clamp area 103 (step S22). When it is determined in step S22 that the input X coordinate is within the range of the X clamp area 103 (YES in step S22), "2" is set for an X area flag. The X area flag indicates the position on the X axis of an X axis coordinate which is input immediately previously (step S23). The input X coordinate is set as the X coordinate of the origin (hereinafter, referred to as the origin X coordinate") (step S24).

Figure 10:
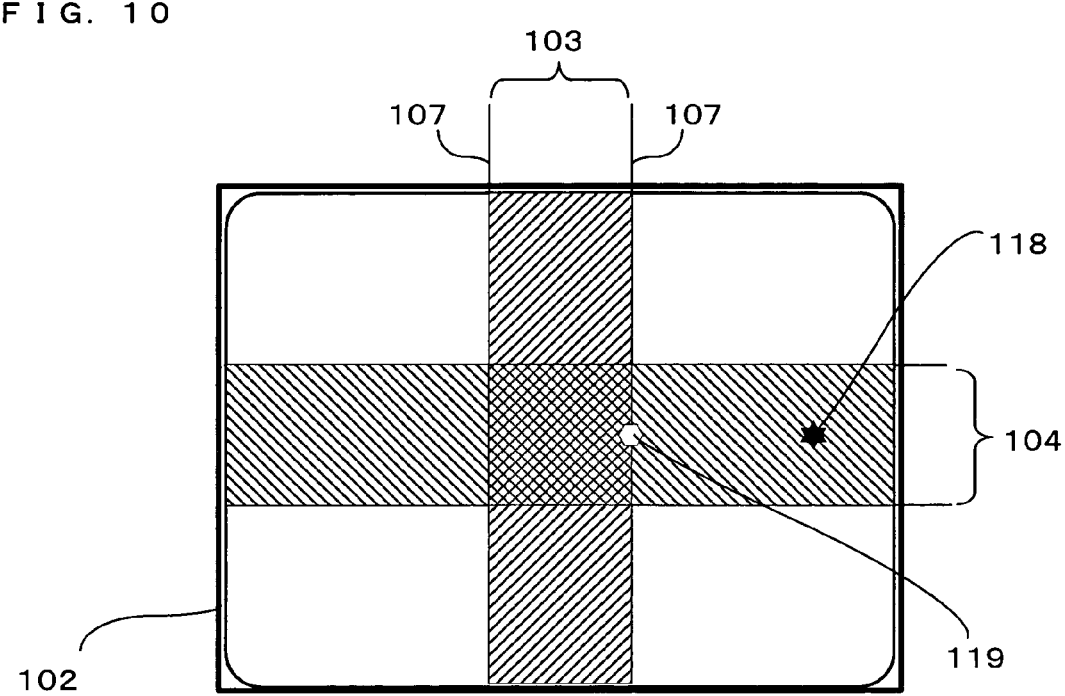
FIG. 10 shows a relationship between an input point and the origin in the operation region 102.

By contrast, when it is determined in step S22 that the input X coordinate is outside the range of the X clamp area 103 (NO in step S22), the CPU 31 sets "1" for the X area flag (step S25). Then, the X coordinate of the border 107 between the X clamp area 103 and the out-of-clamp area 106, which is the closest border of the X clamp area 103 to the input coordinate set in the X axis direction, is set as the origin X coordinate (step S26). For example, in the case of FIG. 6 described above, when the point 114 is touched, the X coordinate of the point 115 is set as the origin X coordinate. As shown in FIG. 10, when a point 118 in a right area of the operation region 102 is touched, the X coordinate of a point 119 on the right border 107 (i.e., the X coordinate of the right border 107), which is the closest border of the X clamp area 103 to the point 118, is set as the origin X coordinate. Thus, the touch-on X axis processing is terminated.

Returning to FIG. 8, after the touch-on X axis processing, touch-on Y axis processing is executed (step S5).

Figure 11:
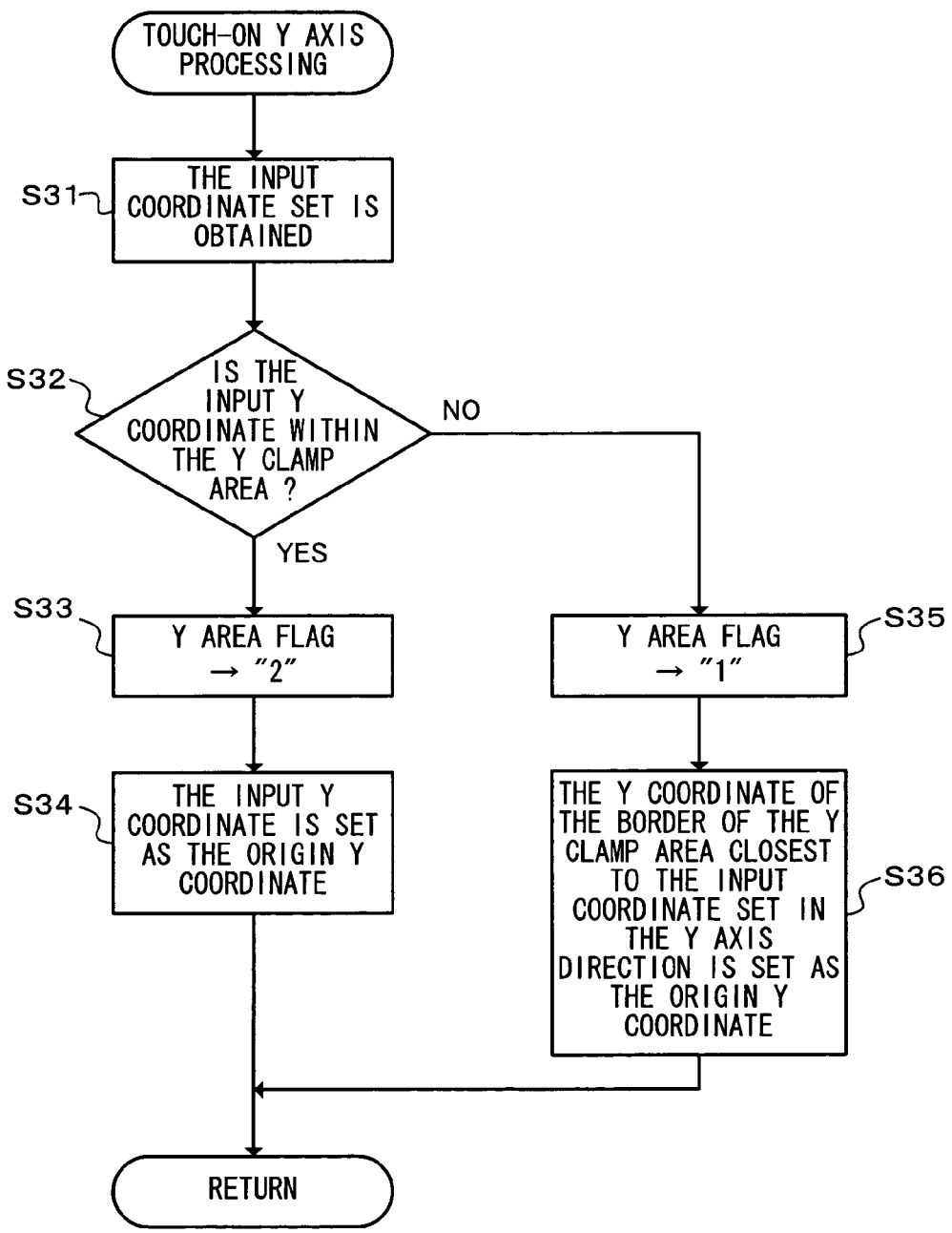
FIG. 11 is a flowchart illustrating touch-on Y axis processing in step S5 in FIG. 8.
Figure 12:
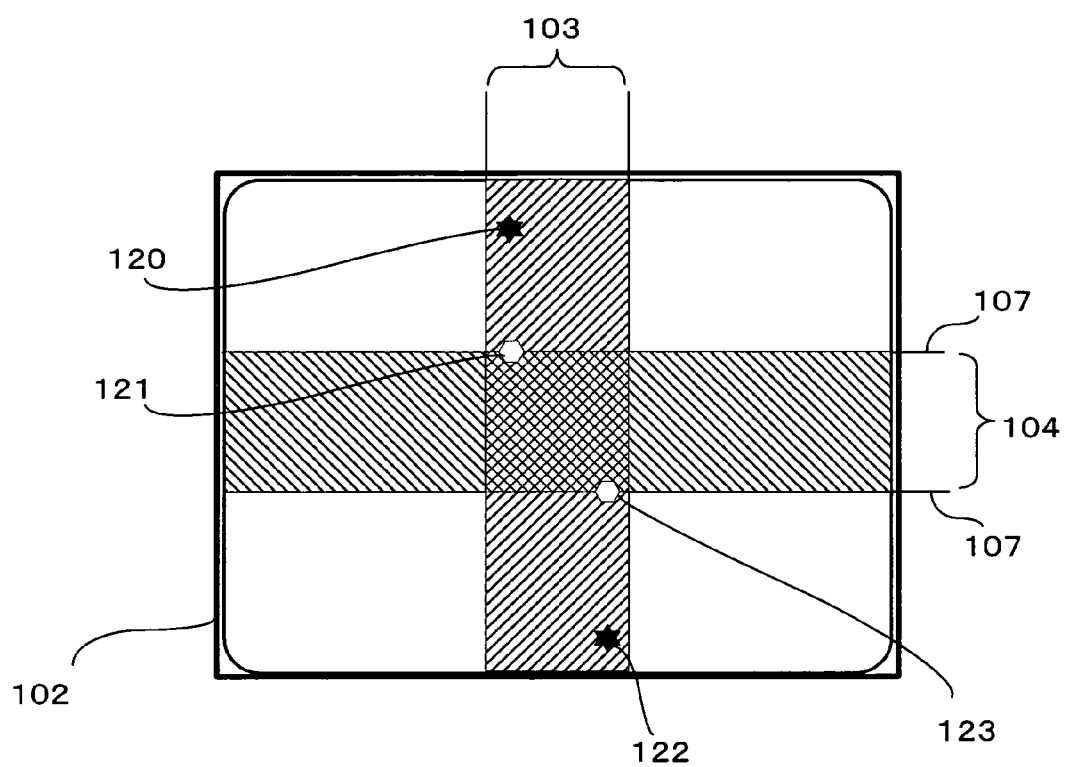
FIG. 12 shows a relationship between an input point and the origin in the operation region 102.

FIG. 11 is a flowchart illustrating the touch-on Y axis processing in step S5 in detail. Referring to FIG. 11, the CPU 31 first obtains the input coordinate set which is output from the touch panel 16 (step S31). Next, the CPU 31 determines whether or not the Y axis coordinate of the obtained input coordinate set (hereinafter, referred to as the "input Y coordinate) is within the range of the Y clamp area 104 (step S32). When it is determined in step S32 that the input Y coordinate is within the range of the Y clamp area 104 (YES in step S32), "2" is set for a Y area flag. The Y area flag indicates the position on the Y axis of a Y axis coordinate which is input immediately previously (step S33). The input Y coordinate is set as the Y coordinate of the origin (hereinafter, referred to as the origin Y coordinate") (step S34).

By contrast, when it is determined in step S32 that the input Y coordinate is outside the range of the Y clamp area 104 (NO in step S32), the CPU 31 sets "1" for the Y area flag (step S35). Then, the Y coordinate of the border 107 of the Y clamp area 104 which is closest to the input coordinate set in the Y axis direction is set as the origin Y coordinate (step S36). For example, in the case of FIG. 12, when a point 120 is touched, the Y coordinate of a point 121 is set as the origin Y coordinate. When a point 122 is touched, the Y coordinate of a point 123 is set as the origin Y coordinate. Thus, the touch-on Y axis processing is terminated.

Returning to FIG. 8, when it is determined in step S2 that the touch operation has been kept (YES in step S2), the following processing is executed in steps S6 and S7. First, X axis direction processing is executed (step S6).

Figure 13:
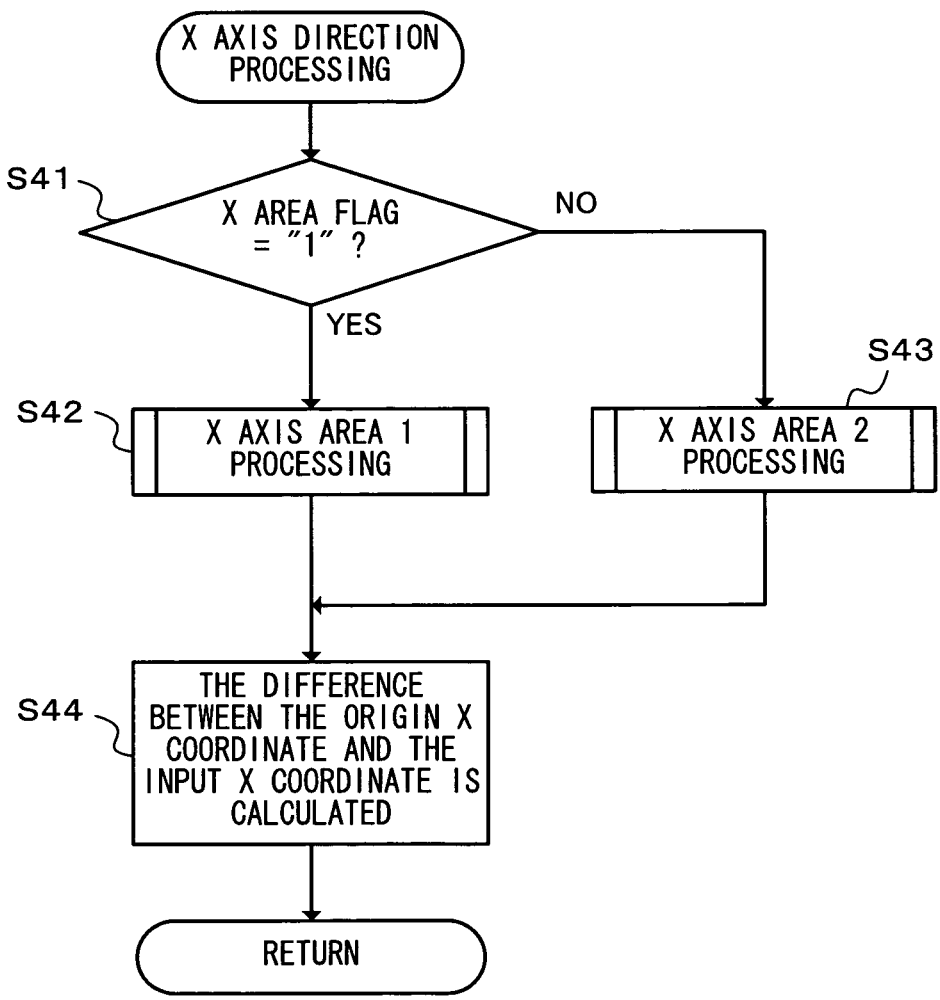
FIG. 13 is a flowchart illustrating X axis direction processing in step S6 in FIG. 8.

FIG. 13 is a flowchart illustrating the X axis direction processing in step S6 in detail. Referring to FIG. 13, the CPU 31 first determines whether or not the X area flag is "1" (step S41). When the X area flag is "1" (YES in step S41), the processing is advanced to X axis area 1 processing (step S42). By contrast, when the X area flag is not "1" (NO in step S41), the processing is advanced to X axis area 2 processing (step S43).

Figure 14:
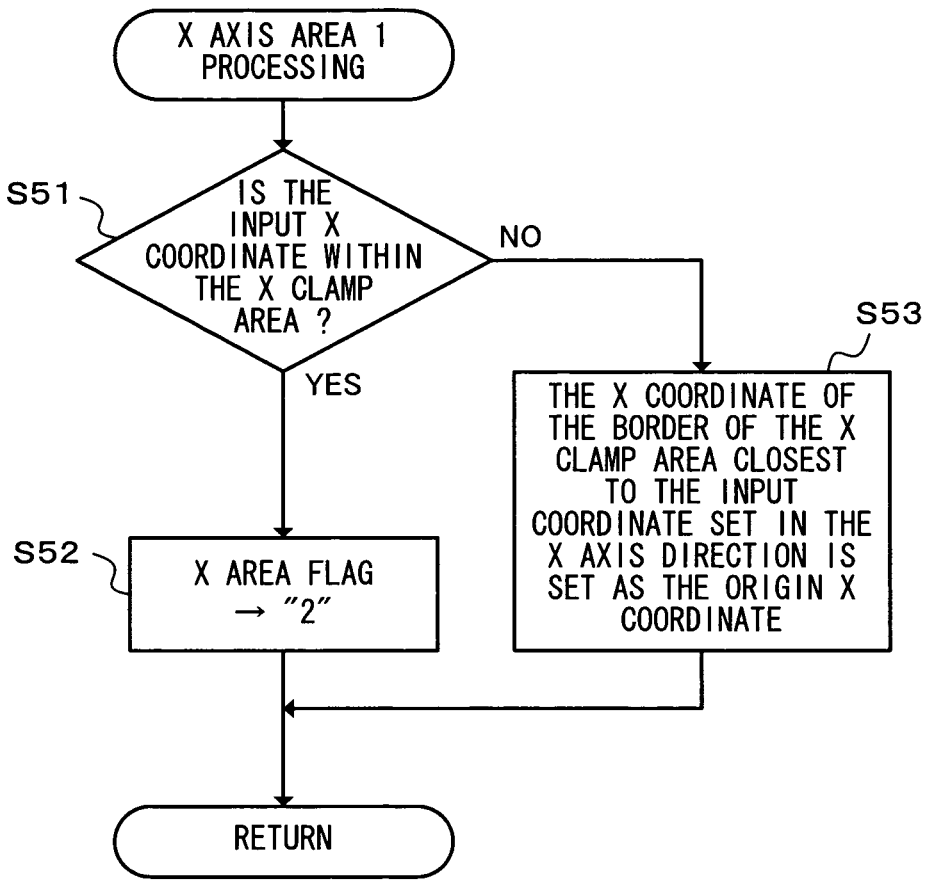
FIG. 14 is a flowchart illustrating X axis area 1 processing in step S42 in FIG. 13.

FIG. 14 is a flowchart illustrating the X axis area 1 processing in step S42 in detail. Referring to FIG. 14, the CPU 31 first determines whether or not the input X coordinate is within the X clamp area 103 (step S51). When it is determined that the input X coordinate is within the X clamp area 103 (YES in step S51), this means that the input coordinate set enters the X clamp area 103 from outside. Therefore, "2" is set for the X area flag (step S52). By contrast, when it is determined that the input X coordinate is outside the X clamp area 103 (NO in step S51), the X coordinate of the border 107 of the X clamp area 103 which is closest to the input coordinate set in the X axis direction is set as the origin X coordinate as described above with reference to FIG. 6 (step S53). Thus, the X axis area 1 processing is terminated.

Figure 15:
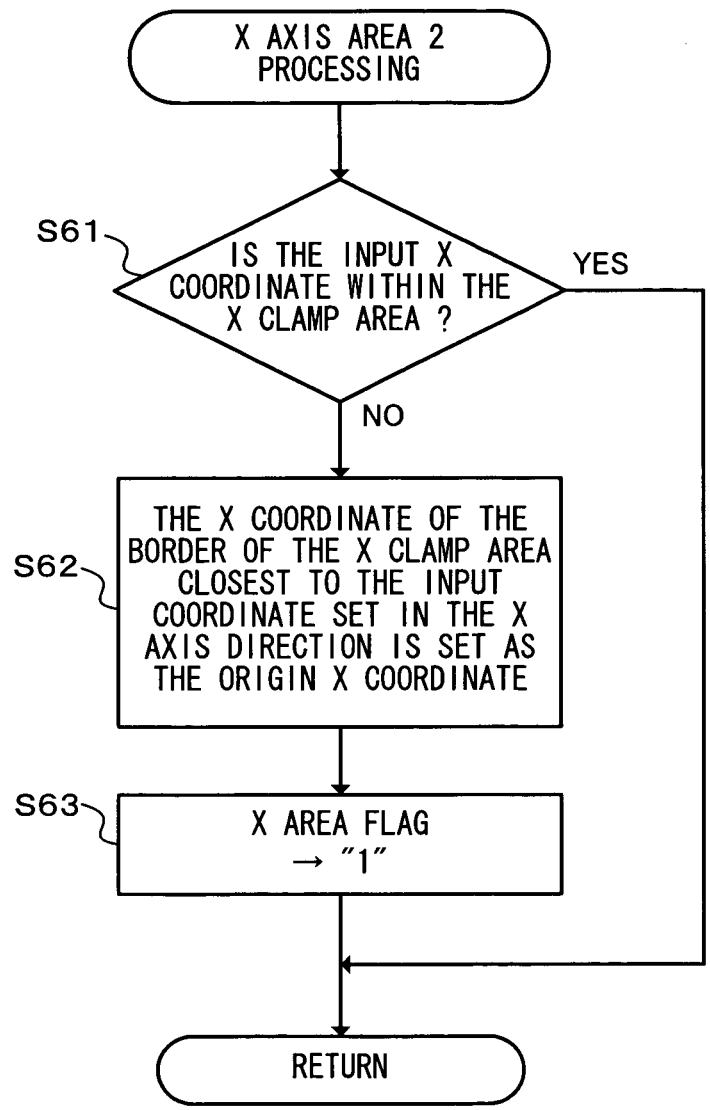
FIG. 15 is a flowchart illustrating X axis area 2 processing in step S43 in FIG. 13.

FIG. 15 is a flowchart illustrating the X axis area 2 processing in step S43 in detail. Referring to FIG. 15, the CPU 31 first determines whether or not the input X coordinate is within the X clamp area 103 (step S61). When it is determined that the input X coordinate is within the X clamp area 103 (YES in step S61), the processing is terminated. Namely, while a position in the X clamp area 103 is being touched, the origin X coordinate is not changed. By contrast, when it is determined that the input X coordinate is outside the X clamp area 103 (NO in step S61), the X coordinate of the border 107 of the X clamp area 103 which is closest to the input coordinate set in the X axis direction is set as the origin X coordinate as described above with reference to FIG. 6 (step S62). Then, "1" is set for the X area flag (step S63). Thus, the X axis area 2 processing is terminated.

Returning to FIG. 13, after step S42 or S43, the CPU 31 calculates a difference between the origin coordinate set and the input coordinate set in terms of the X coordinate, i.e., a difference between the origin X coordinate and the input X coordinate (step S44). Thus, the X axis direction processing is terminated.

Figure 16:
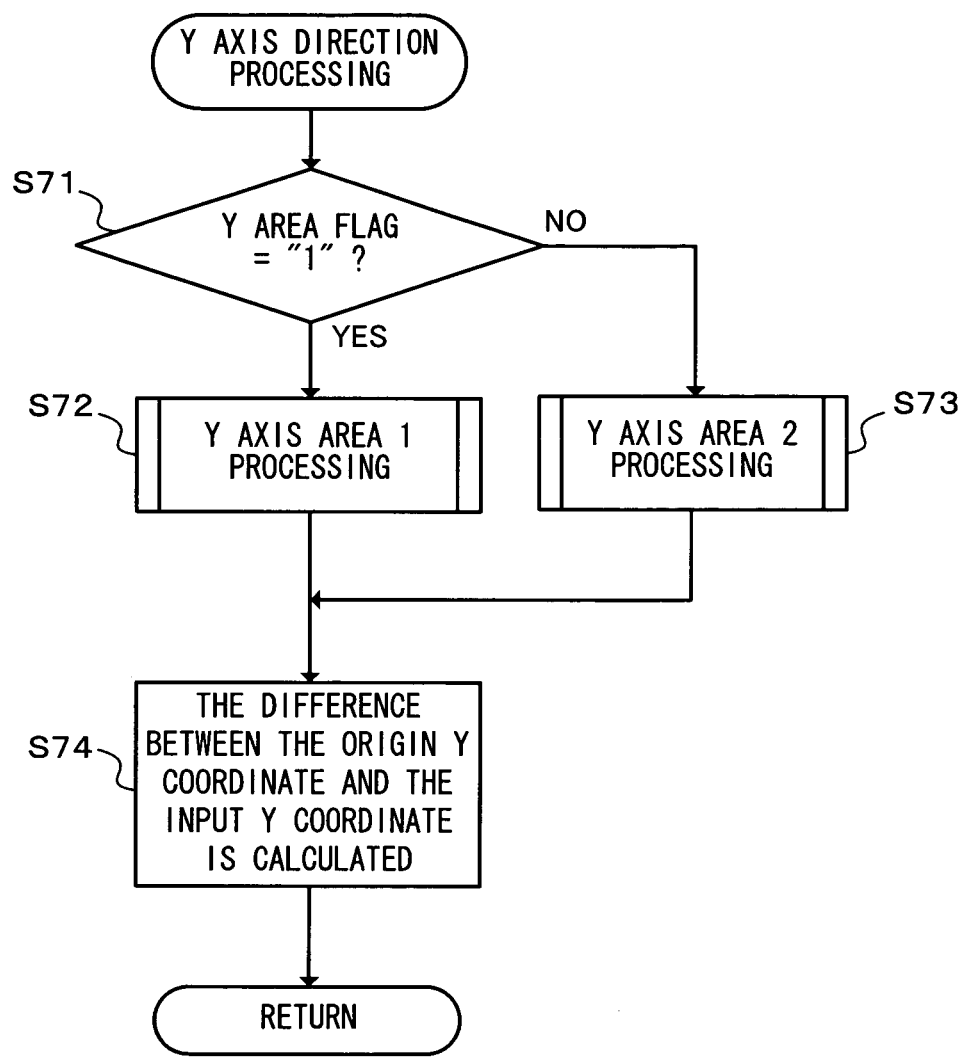
FIG. 16 is a flowchart illustrating Y axis direction processing in step S7 in FIG. 8.

Returning to FIG. 8, after the X axis direction processing in step S6, Y axis direction processing is executed (step S7). FIG. 16 is a flowchart illustrating the Y axis direction processing in step S7 in detail. Referring to FIG. 16, the CPU 31 first determines whether or not the Y area flag is "1" (step S71). When the Y area flag is "1" (YES in step S71), the processing is advanced to Y axis area 1 processing (step S72). By contrast, when the Y area flag is not "1" (NO in step S71), the processing is advanced to Y axis area 2 processing (step S73).

Figure 17:
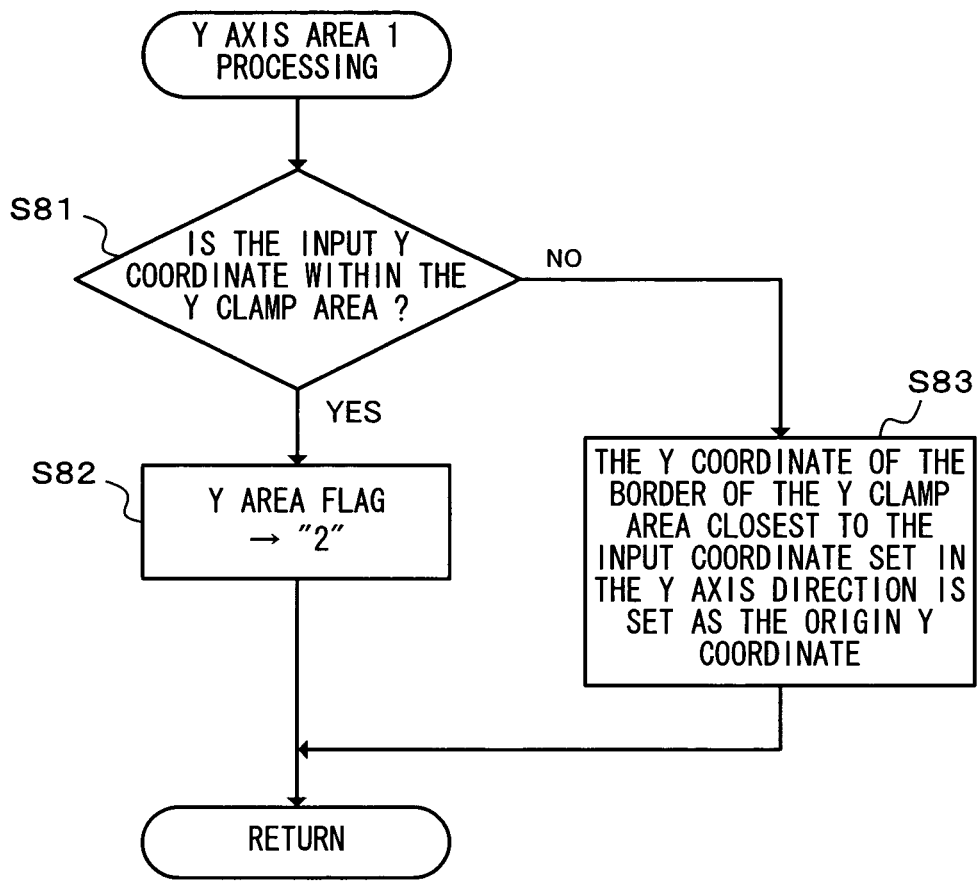
FIG. 17 is a flowchart illustrating Y axis area 1 processing in step S72 in FIG. 16.

FIG. 17 is a flowchart illustrating the Y axis area 1 processing in step S72 in detail. Referring to FIG. 17, the CPU 31 first determines whether or not the input Y coordinate is within the Y clamp area 104 (step S81). When it is determined that the input Y coordinate is within the Y clamp area 104 (YES in step S81), "2" is set for the Y area flag (step S82). By contrast, when it is determined that the input Y coordinate is outside the Y clamp area 104 (NO in step S81), the Y coordinate of the border 107 of the Y clamp area 104 which is closest to the input coordinate set in the Y axis direction is set as the origin Y coordinate as described above with reference to FIG. 12 (step S83). Thus, the Y axis area 1 processing is terminated.

Figure 18:
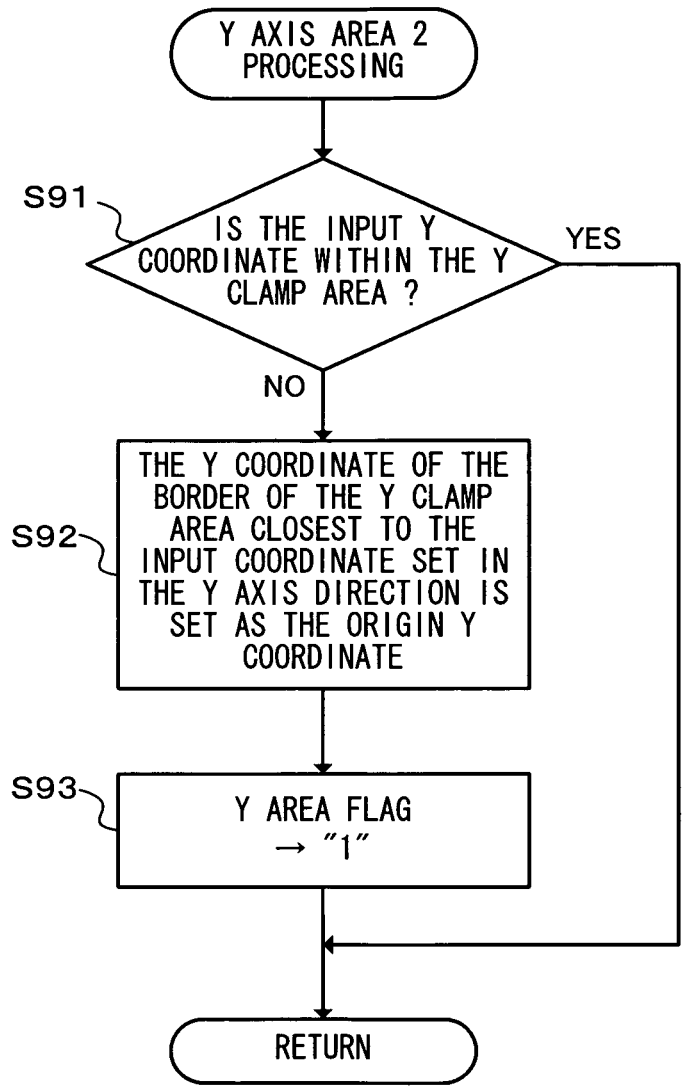
FIG. 18 is a flowchart illustrating Y axis area 2 processing in step S73 in FIG. 16.

FIG. 18 is a flowchart illustrating the Y axis area 2 processing in step S73 in detail. Referring to FIG. 18, the CPU 31 first determines whether or not the input Y coordinate is within the Y clamp area 104 (step S91). When it is determined that the input Y coordinate is within the Y clamp area 104 (YES in step S91), the processing is terminated. When it is determined that the input Y coordinate is outside the Y clamp area 104 (NO in step S91), the Y coordinate of the border 107 of the Y clamp area 104 which is closest to the input coordinate set in the Y axis direction is set as the origin Y coordinate as described above with reference to FIG. 12 (step S92). Then, "1" is set for the Y area flag (step S93). Thus, the Y axis area 2 processing is terminated.

Returning to FIG. 16, after step S72 or S73, the CPU 31 calculates a difference between the origin coordinate set and the input coordinate set in terms of the Y coordinate (step S74). Thus, the Y axis direction processing is terminated.

Returning to FIG. 8, after the touch-on Y axis processing in step S5, the Y axis direction processing in step S7 or the processing in step 9, the CPU 31 controls an operation on the object, which is the operation target of the player, based on the obtained difference between the input coordinate set and the origin in terms of the X coordinate and the Y coordinate (step S10). For example, the CPU 31 obtains a distance L1 from the difference between the input coordinate set and the origin. Specifically, where the input coordinate set is (tx, ty) and the origin is (ox, oy) in the coordinate system representing the operation region 102, the CPU 31 obtains differences vx and vy based on:

$$vx = ox - tx; \text{ and}$$

$$vy = oy - ty.$$

The CPU 31 obtains the distance L1 based on:

$$L1 = \sqrt{vx^2 + vy^2}.$$

Thus, the distance L1 between the input coordinate set and the origin in the coordinate system representing the operation region 102 is obtained. In addition, the moving direction indicated by the player is obtained based on a vector from the origin to the input coordinate set (tx−ox, ty−oy). When the vector has a value of directing rightward, the object as the operation target of the player is controlled to be moved rightward at the moving speed in accordance with the distance L1 (the moving speed is higher as the distance L1 is longer). As a result of such processing, when the player touches an edge area of the touch panel 16, a large value is calculated as the distance between the origin and the input coordinate set. Therefore, the flying direction of the airplane 101 is significantly changed. By contrast, when the player keeps on touching the central area, precision operations can be performed without changing the flying direction of the airplane 101 almost at all. The game processing according to the first exemplary embodiment is performed in this manner.

As described above, according to the first exemplary embodiment, when a position within the clamp area is touched, the coordinate set of the touch position is set as the origin. When a position outside the clamp area is touched, the coordinate set on the closest border is set as the origin. Owing to this, an operation of moving an object by a large distance, for example, an operation of turning the steering wheel rapidly, can be easily performed merely by touching a position near an edge of the touch panel 16. Since the origin is set on the border closest to the input coordinate set, not at the center of the operation region 102, the moving amount of the stylus pen 17 can be kept small for, for example, performing an operation of returning the steering wheel rightward after being once turned leftward. Thus, the operation responsiveness can be improved and the operability is enhanced. When a position in the central area of the touch panel 16 is touched, the input coordinate set is set as the origin. Therefore, the operability is not reduced by excessive responsiveness; for example, the flying direction is not shifted even when the input coordinate set is slightly offset from the origin due to the instability of the position of the hand. This is a stark difference from the case where the origin is fixed at the center of the touch panel 16. As a result, a game with a high operability which matches the operational sense of humans with appropriate responsiveness, i.e., responsiveness not too sensitive or not too insensitive, is provided.

In the above exemplary embodiment, a coordinate set on a border of a clamp area is used as the origin which is outside the clamp area. Such a position is not limited to a position on a border, and may be any position between the coordinate set and the border of the clamp area (any position on a line segment connecting the input coordinate set and the border of the clamp area). For example, referring to FIG. 7, the position of the point 117, which is on the border 107, may be slightly shifted leftward and upward.

After the touch-on is performed and the origin is set, the position of the origin may be set not to be moved until the time of touch-off.

The size of the clamp area may be changed in accordance with the development of the game. In this case, the operability of the touch panel 16 can be changed in accordance with the development of the game. Thus, a game with a wider variety of operations can be provided.

Second Exemplary Embodiment

With reference to FIG. 19 through FIG. 30, a second exemplary embodiment will be described. In the first exemplary embodiment, when a position outside a clamp area is touched, a position on the border of the clamp area is set as the origin. In the second exemplary embodiment, an intermediate area is provided outside the clamp area. When a position in the intermediate area is touched, the input coordinate set is set as the origin. However, as the time passes, the origin is moved to a position on the border of the clamp area.

Figure 19:
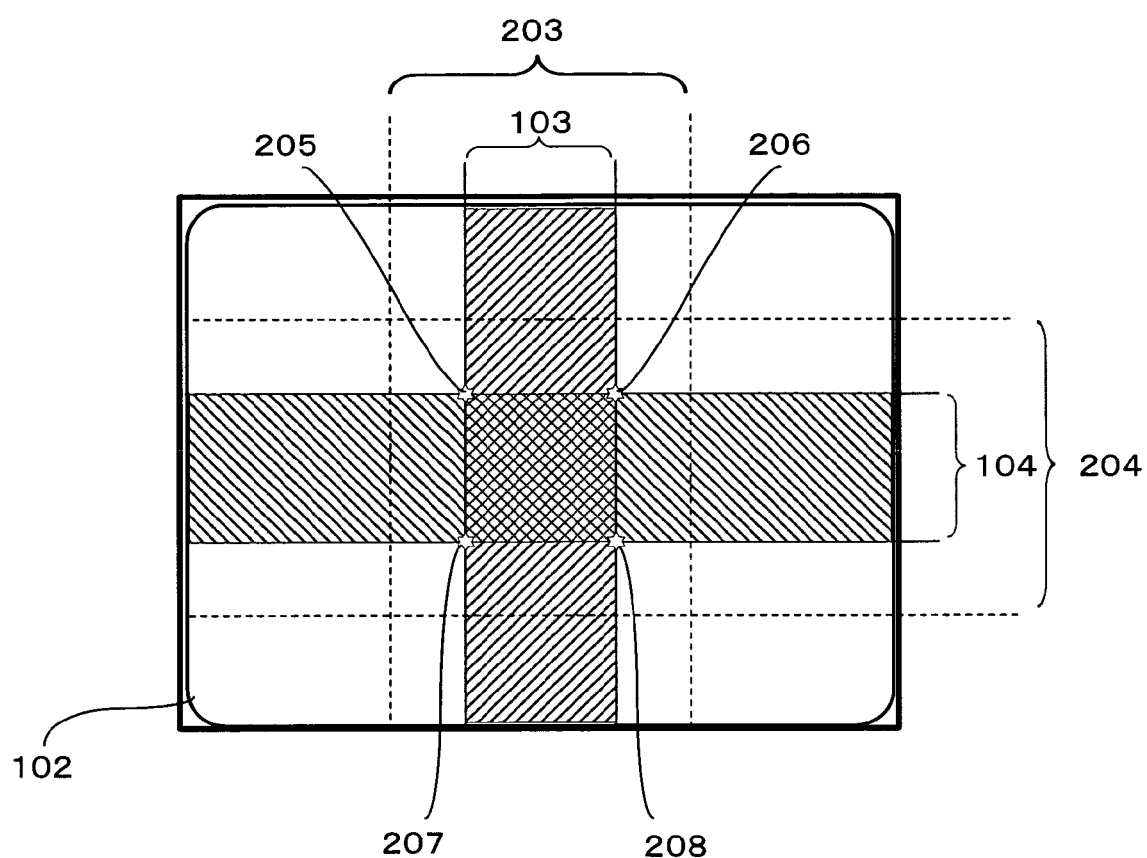
FIG. 19 shows an example of how the operation region 102 is divided into a plurality of areas in the second exemplary embodiment.

FIG. 19 shows an exemplary area definition of the operation region 102, which is the operation screen of the touch panel 16 in the second exemplary embodiment. FIG. 19 shows an X intermediate area 203 encompassing the X clamp area 103, and a Y intermediate area 204 encompassing the Y clamp area 104. When the player touches a position which is in the intermediate 203, 204 but is outside the clamp area 103, 104, the input coordinate set is once set as the origin. As the time passes, the origin is moved to a position on the border of the clamp area, i.e., the closest point on the border between the clamp area and the intermediate area in FIG. 19. This is performed in consideration of the sense of balance of humans. For example, even when the player first touches a point to the left of the center of the operation region 102, the player unconsciously moves his/her finger toward the center of the operation region 102 while keeping the touch operation. The reason is that when the origin is located in the central area of the operation region 102, humans feel more balanced. For this reason, when the touch position is not in the central area or in the edge area, the touch position is gradually moved toward the central area. In this way, the operability of the operation region 102 is matched to the sense of balance of humans and thus is improved. (When the touch position is near the edge of the operation region 102, the origin is not moved because it is considered that the player intentionally touches such a position as described above. In addition, if the origin is moved to the center, the above-described problem occurs that the flying direction of the airplane 101 as the operation target is shifted even when the input coordinate set is only slightly offset from the origin. Therefore, the origin is moved toward the center when the touch position is in the intermediate area.)

The structure of the game apparatus 10 used in this exemplary embodiment is the same as that described above with reference to FIG. 1 and FIG. 2, and will not be described in detail. The elements of the game apparatus 10 bear the identical reference numerals to those mentioned above.

Figure 20:
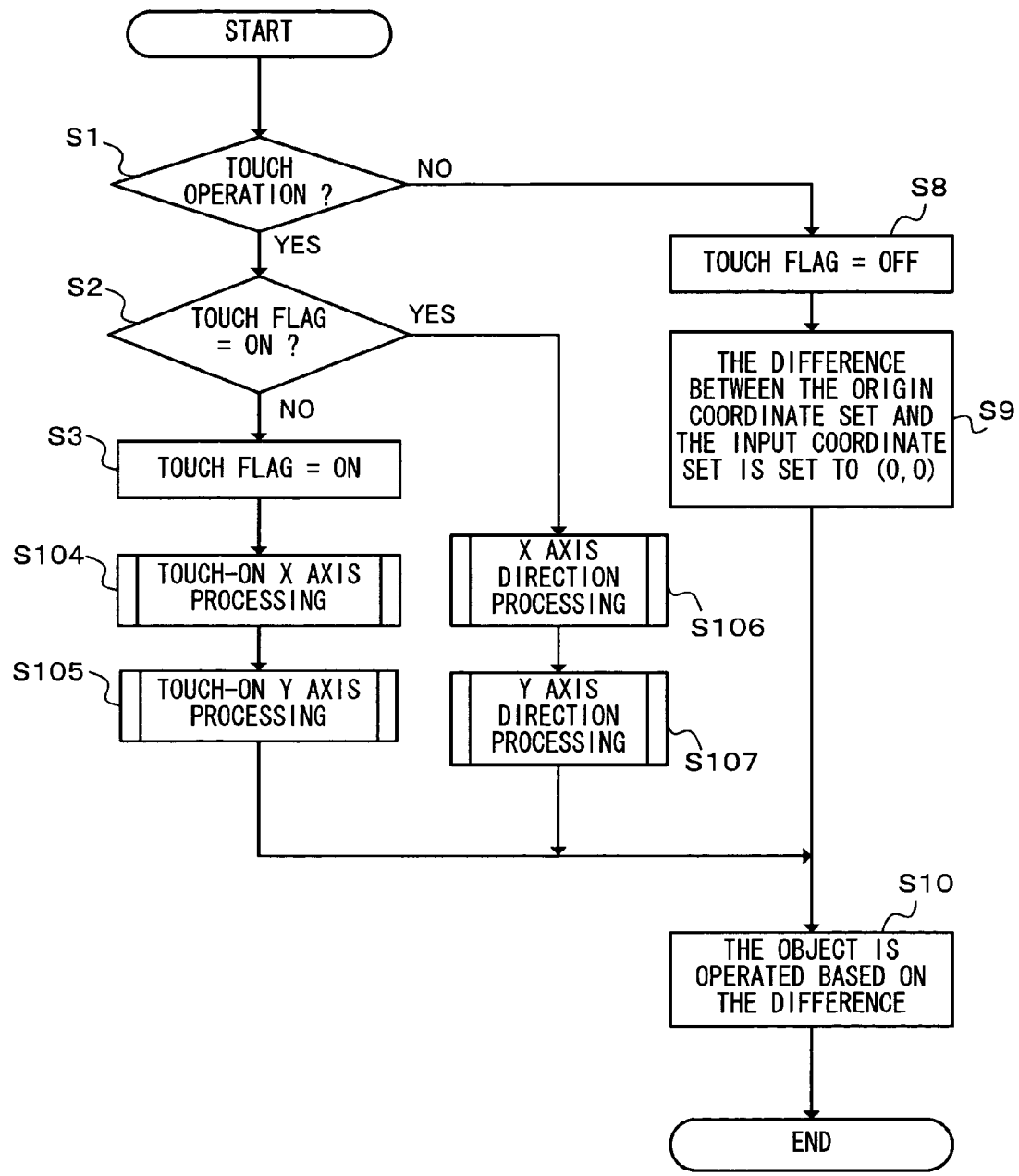
FIG. 20 is a flowchart illustrating a flow of game processing executed by the game apparatus 10 in the second exemplary embodiment.

Hereinafter, with reference to FIG. 20 through FIG. 30, game processing according to the second exemplary embodiment will be described in detail. FIG. 20 is a flowchart illustrating a flow of the game processing according to the second exemplary embodiment. In the flow shown in FIG. 20, the processing in steps S4 through S7 in FIG. 8 is replaced with processing in steps S104 through S107. The processing other than that in steps S104 through S107 will not be described in detail.

Figure 21:
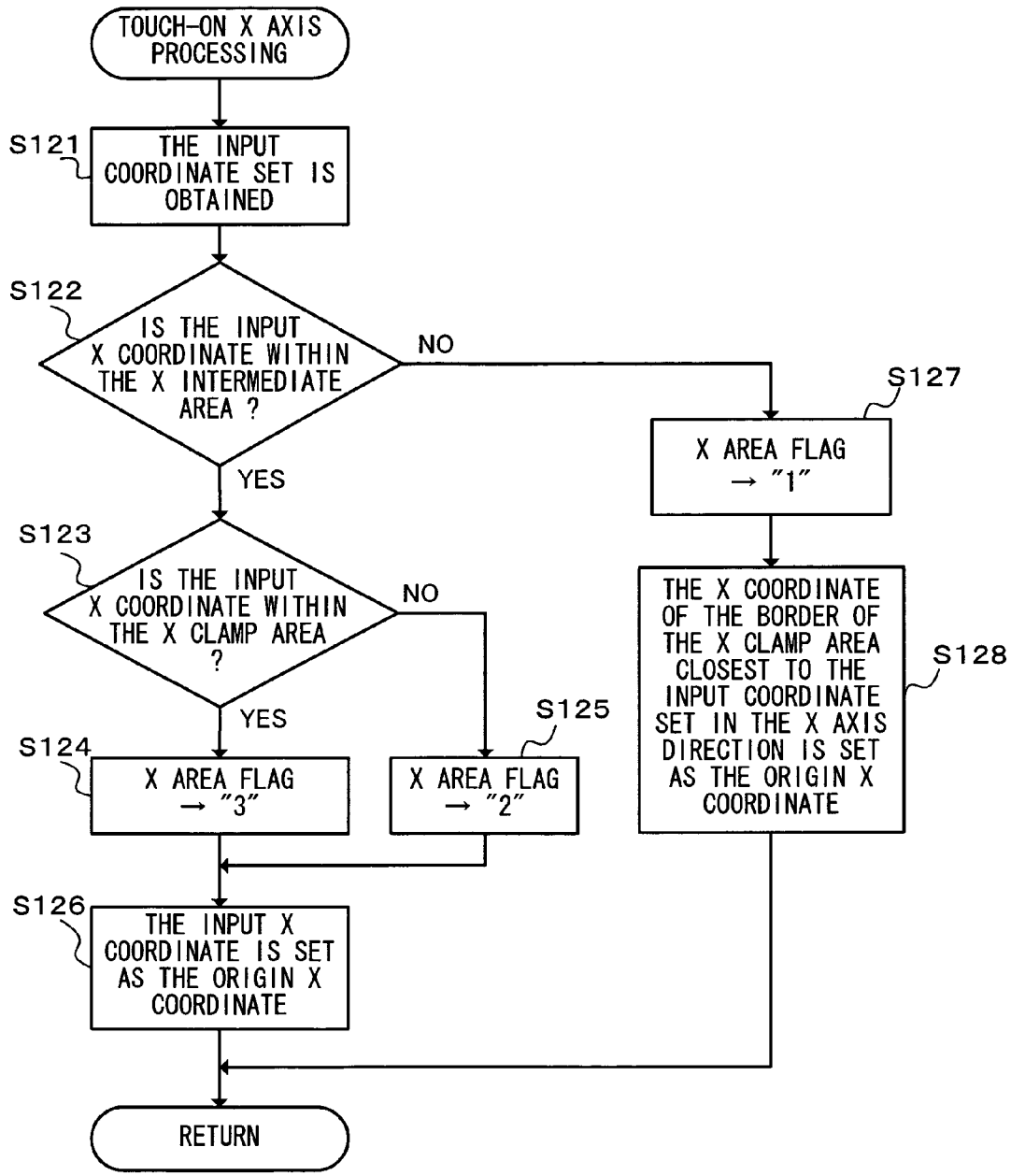
FIG. 21 is a flowchart illustrating touch-on X axis processing in step S104 in FIG. 20.

FIG. 21 is a flowchart illustrating touch-on X axis processing in step S104 in the second exemplary embodiment in detail. Referring to FIG. 21, the CPU 31 first obtains an input coordinate set which is output from the touch panel 16 (step S121). Next, the CPU 31 determines whether or not the X axis coordinate of the obtained input coordinate set is within the range of the X intermediate area 203 (step S122). When it is determined in step S122 that the input X coordinate is within the range of the X intermediate area 203 (YES in step S122), the CPU 31 determines whether or not the input X coordinate is within the range of the X clamp area 103 (step S123). When it is determined in step S123 that the input X coordinate is within the range of the X clamp area 103 (YES in step S123), "3" is set for the X area flag (step S124). By contrast, when it is determined in step S123 that the input X coordinate is outside the range of the X clamp area 103 (NO in step S123), "2" is set for the X area flag (step S125). After step S124 or S125, the CPU sets the input X coordinate as the origin X coordinate (step S126).

By contrast, when it is determined in step S122 that the input X coordinate is outside the range of the X intermediate area 203 (NO in step S122), the CPU 31 sets "1" for the X area flag (step S127). Then, the X coordinate of the border between the X clamp area 103 and the X intermediate area 203, which is the closest border to the input coordinate set in the X axis direction, is set as the origin X coordinate (step S128). Thus, the touch-on X axis processing is terminated.

Returning to FIG. 20, after the touch-on X axis processing, touch-on Y axis processing is executed (step S105).

Figure 22:
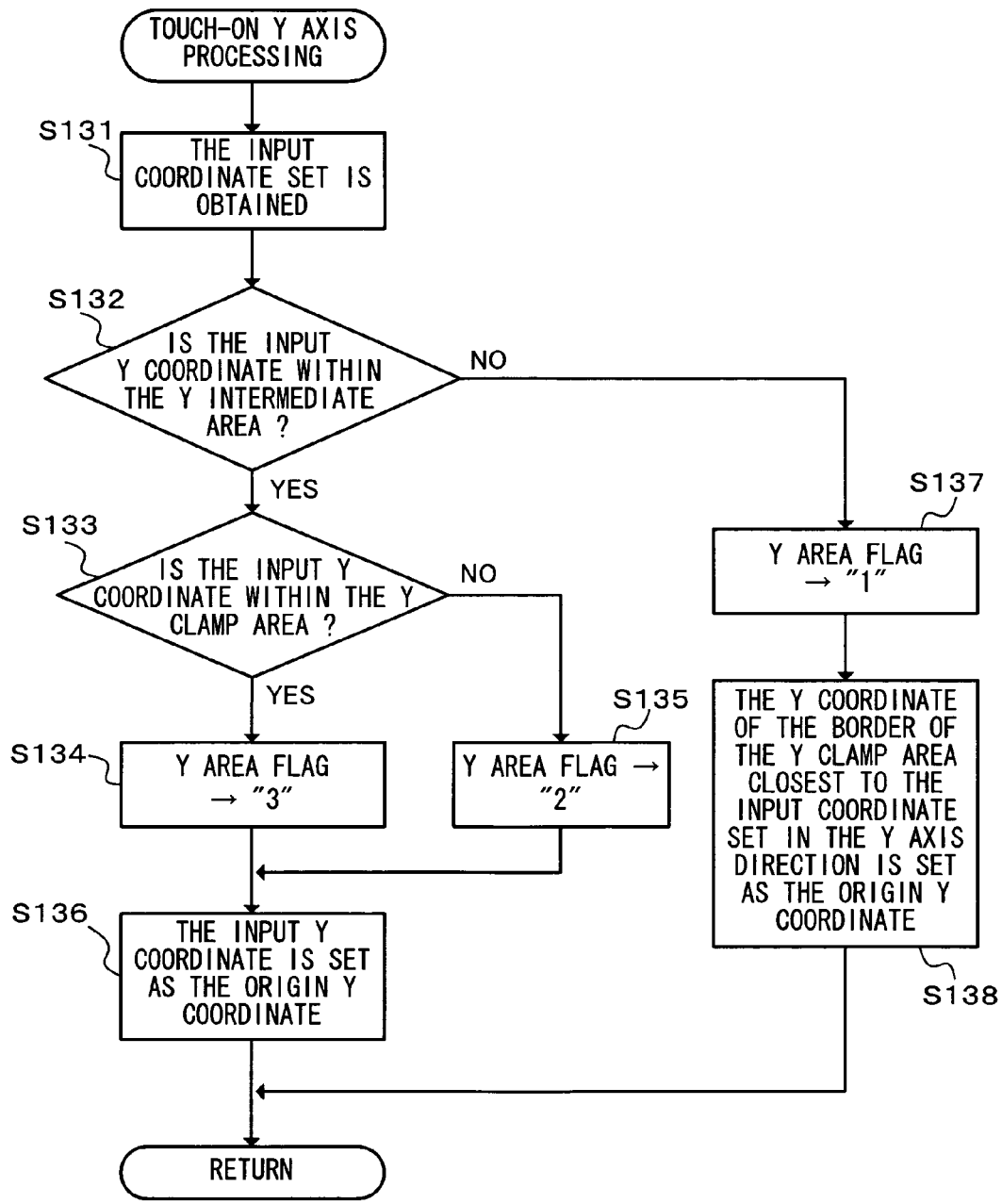
FIG. 22 is a flowchart illustrating touch-on Y axis processing in step S105 in FIG. 20.

FIG. 22 is a flowchart illustrating touch-on Y axis processing in step S105 in detail. Referring to FIG. 22, the CPU 31 first obtains an input coordinate set which is output from the touch panel 16 (step S131). Next, the CPU 31 determines whether or not the Y axis coordinate of the obtained input coordinate set is within the range of the Y intermediate area 204 (step S132). When it is determined in step S132 that the input Y coordinate is within the range of the Y intermediate area 204 (YES in step S132), the CPU 31 determines whether or not the input Y coordinate is within the range of the Y clamp area 104 (step S133). When it is determined in step S133 that the input Y coordinate is within the range of the Y clamp area 104 (YES in step S133), "3" is set for the Y area flag (step S134). By contrast, when it is determined in step S133 that the input Y coordinate is outside the range of the Y clamp area 104 (NO in step S133), "2" is set for the Y area flag (step S135). After step S134 or S135, the CPU sets the input Y coordinate as the origin Y coordinate (step S136).

By contrast, when it is determined in step S132 that the input Y coordinate is outside the range of the Y intermediate area 204 (NO in step S132), the CPU 31 sets "1" for the Y area flag (step S137). Then, the Y coordinate of the border between the Y clamp area 104 and the Y intermediate area 204, which is the closest border to the input coordinate set in the Y axis direction, is set as the origin Y coordinate (step S138). Thus, the touch-on Y axis processing is terminated. By such processing, when the touch position is in the clamp area or the intermediate area, the input coordinate set is set as the origin. When the touch position is outside the intermediate area, a point on the border between the clamp area and the intermediate area, which is closest to the input coordinate set, is set as the origin.

Returning to FIG. 20, when it is determined in step S2 that the touch operation has been kept (YES in step S2), the following processing is executed in steps S106 and S107. First, X axis direction processing is executed (step S106).

Figure 23:
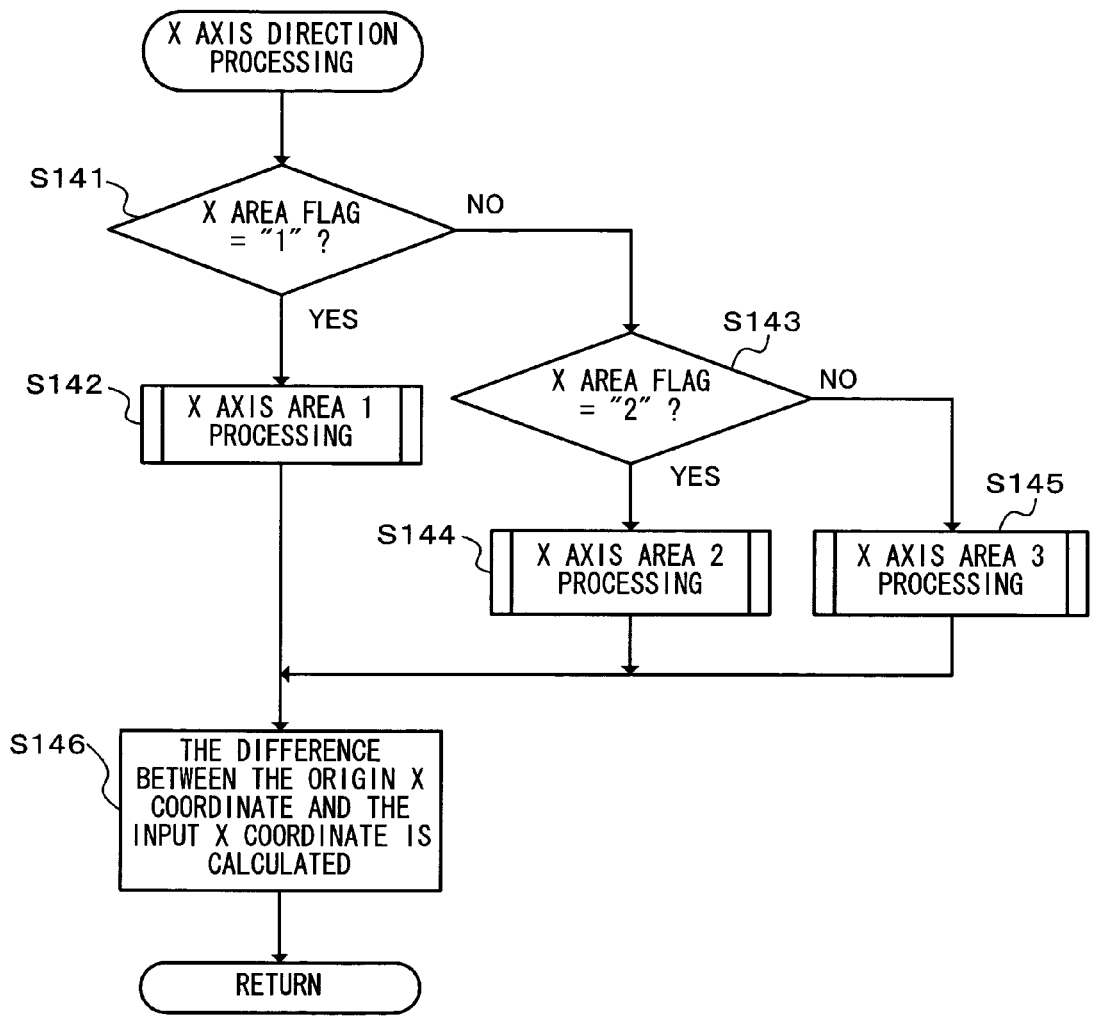
FIG. 23 is a flowchart illustrating X axis direction processing in step S106 in FIG. 20.

FIG. 23 is a flowchart illustrating the X axis direction processing in step S106 in detail. Referring to FIG. 23, the CPU 31 first determines whether or not the X area flag is "1" (step S141). When the X area flag is "1" (YES in step S141), the processing is advanced to X axis area 1 processing (step S142). By contrast, when the X area flag is not "1" (NO in step S141), it is determined whether or not the X area flag is "2" (step S143). When the X flag is "2" (YES in step S143), the processing is advanced to X axis area 2 processing (step S144). By contrast, when the X flag is not "2" (NO in step S143), the processing is advanced to X axis area 3 processing (step S145).

FIG. 24 is a flowchart illustrating the X axis area 1 processing in step S142 in detail. Referring to FIG. 24, the CPU 31 first determines whether or not the input X coordinate is within the X intermediate area 203 (step S151). When it is determined that the input X coordinate is within the X intermediate area 203 (YES in step S151), "2" is set for the X area flag (step S152). By contrast, when it is determined that the input X coordinate is outside the X intermediate area 203 (NO in step S151), the X coordinate of the border 107 between the X clamp area 103 and the X intermediate area 203, which is the closest border to the input coordinate set in the X axis direction, is set as the origin X coordinate (step S153). Thus, the X axis area 1 processing is terminated.

Figure 25:
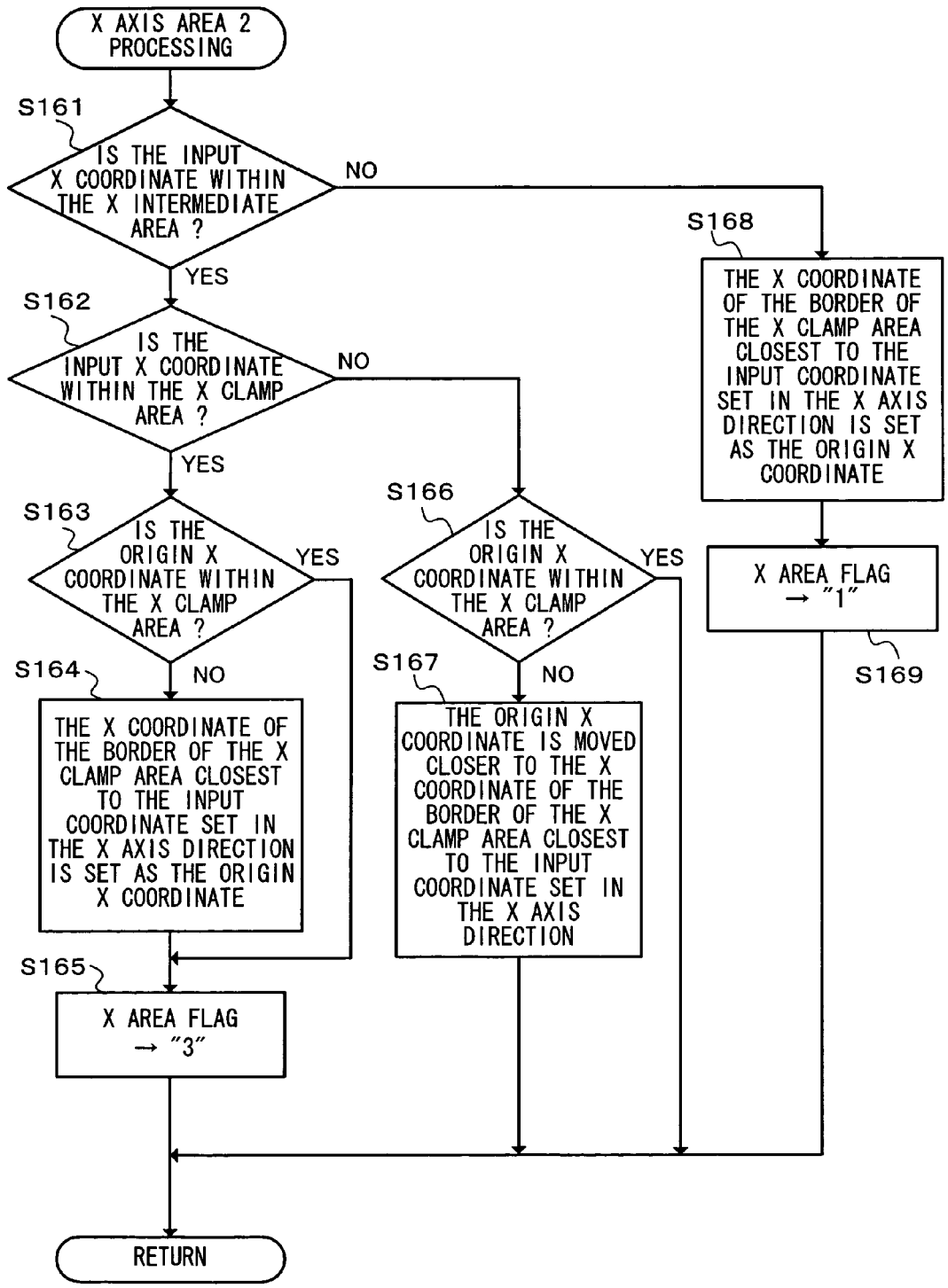
FIG. 25 is a flowchart illustrating X axis area 2 processing in step S144 in FIG. 23.

FIG. 25 is a flowchart illustrating the X axis area 2 processing in step S144 in detail. Referring to FIG. 25, the CPU 31 first determines whether or not the input X coordinate is within the X intermediate area 103 (step S161). When it is determined that the input X coordinate is within the X intermediate area 203 (YES in step S161), it is determined whether or not the input X coordinate is within the X clamp area 103 (step S162). When it is determined that the input X coordinate is within the X clamp area 103 (YES in step S162), it is determined whether or not the origin X coordinate is within the X clamp area 103 (step S163). When it is determined that the origin X coordinate is outside the X clamp area 103 (NO in step S163), the X coordinate of the border of the X clamp area 103 which is closest to the input coordinate set is set as the origin X coordinate (step S164). By contrast, when it is determined that the origin X coordinate is within the X clamp area 103 (YES in step S163), the processing is advanced to step S165. Namely, while a position in the X clamp area 103 is being touched, the origin X coordinate is not changed. "3" is set for the X area flag" (step S165).

By contrast, when it is determined in step S162 that the input X coordinate is within the X intermediate area 203 but outside the X clamp area 103 (NO in step S162), it is determined whether or not the origin X coordinate is within the X clamp area 103 (step S166). When it is determined that the origin X coordinate is outside the X clamp area 103 (NO in step S166), the value of the origin X coordinate is made closer to the X coordinate of the border of the X clamp area 103 closest to the input coordinate set by a predetermined value (step S167). For example, where the predetermined value is 1, the origin X coordinate is made closer to the X coordinate of the closest border frame by frame. As a result, in the X intermediate area 203, the origin X coordinate moves toward the X coordinate on the border of the X clamp area 103 as the time passes. The origin X coordinate is not limited to moving frame by frame, and may be made closer by 1 at every 30 frames. Alternatively, the time duration from the touch-on may be measured, so that the origin X coordinate is moved in accordance with the time duration. Once reaching the border, the origin X coordinate is not moved further. When it is determined in step S166 that the origin X coordinate is in the X clamp area 103 (YES in step S166), the X axis area 2 processing is terminated.

When it is determined in step S161 that the input X coordinate is outside the X intermediate area 203 (NO in step S161), the X coordinate of the border of the X clamp area 103 closest to the input coordinate set is set as the origin X coordinate (step S168). "1" is set for the X area flag (step S169). Thus, the X axis area 2 processing is terminated.

Figure 26:
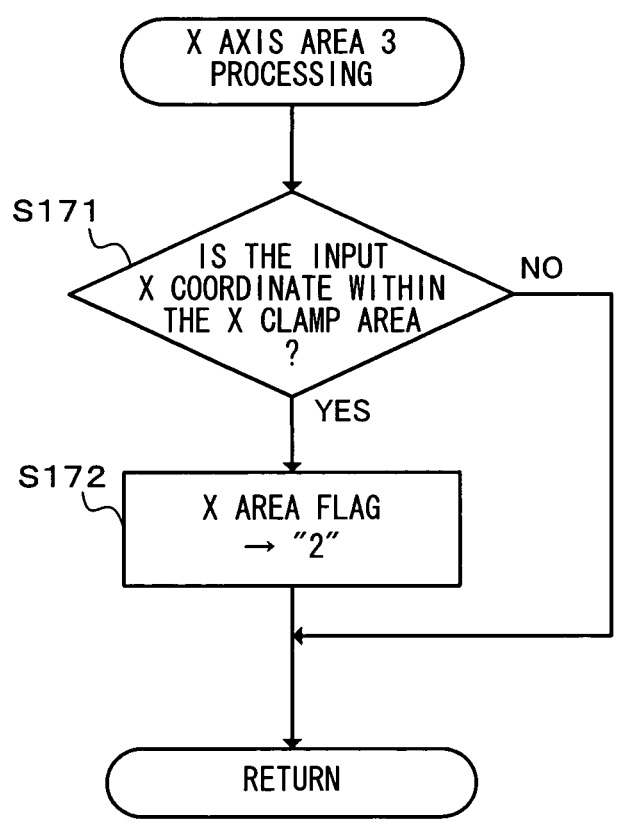
FIG. 26 is a flowchart illustrating X axis area 3 processing in step S145 in FIG. 23.

FIG. 26 is a flowchart illustrating the X axis area 3 processing in step S145. Referring to FIG. 26, the CPU 31 determines whether or not the input X coordinate is within the X clamp area 103 (step S171). When it is determined that the input X coordinate is within the X clamp area 103 (YES in step S171), the X axis area 3 processing is terminated. By contrast, when it is determined that the input X coordinate is outside the X clamp area 103 (NO in step S171), "2" is set for the X area flag (step S172). Thus, the X axis area 3 processing is terminated.

Returning to FIG. 23, after step S142, S144 or S145, the CPU 31 calculates between the origin coordinate set and the input coordinate set in terms of the X coordinate (step S146). Thus, the X axis direction processing is terminated.

Figure 27:
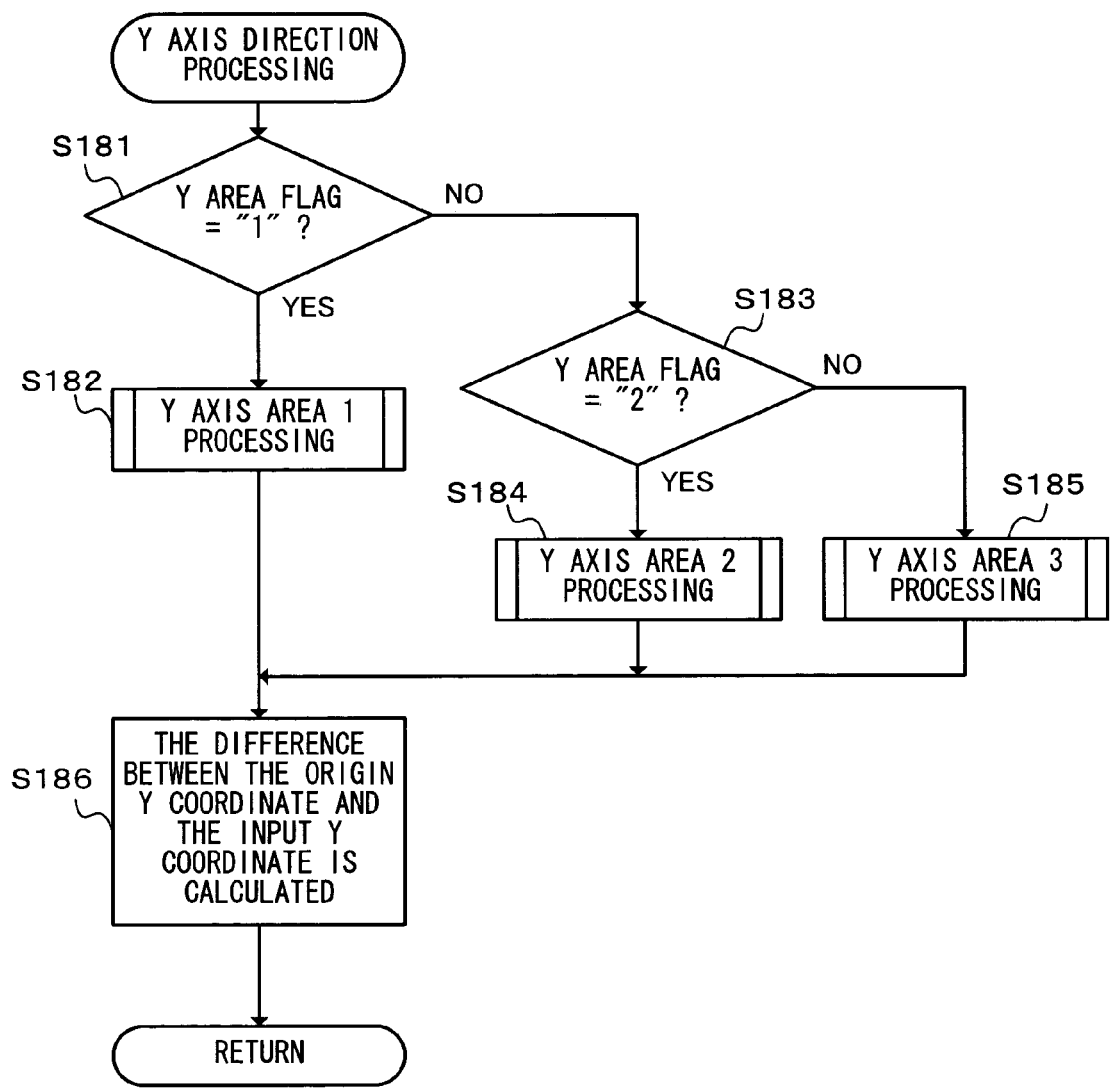
FIG. 27 is a flowchart illustrating Y axis direction processing in step S107 in FIG. 20.

Returning to FIG. 20, after the X axis direction processing in step S106, Y axis direction processing is executed (step S107). FIG. 27 is a flowchart illustrating the Y axis direction processing in step S107 in detail. Referring to FIG. 27, the CPU 31 first determines whether or not the Y area flag is "1" (step S181). When the Y area flag is "1" (YES in step S181), the processing is advanced to Y axis area 1 processing (step S182). By contrast, when the Y area flag is not "1" (NO in step S181), it is determined whether or not the Y area flag is "2" (step S183). When the Y flag is "2" (YES in step S183), the processing is advanced to Y axis area 2 processing (step S184). By contrast, when the Y flag is not "2" (NO in step S183), the processing is advanced to Y axis area 3 processing (step S185).

Figure 28:
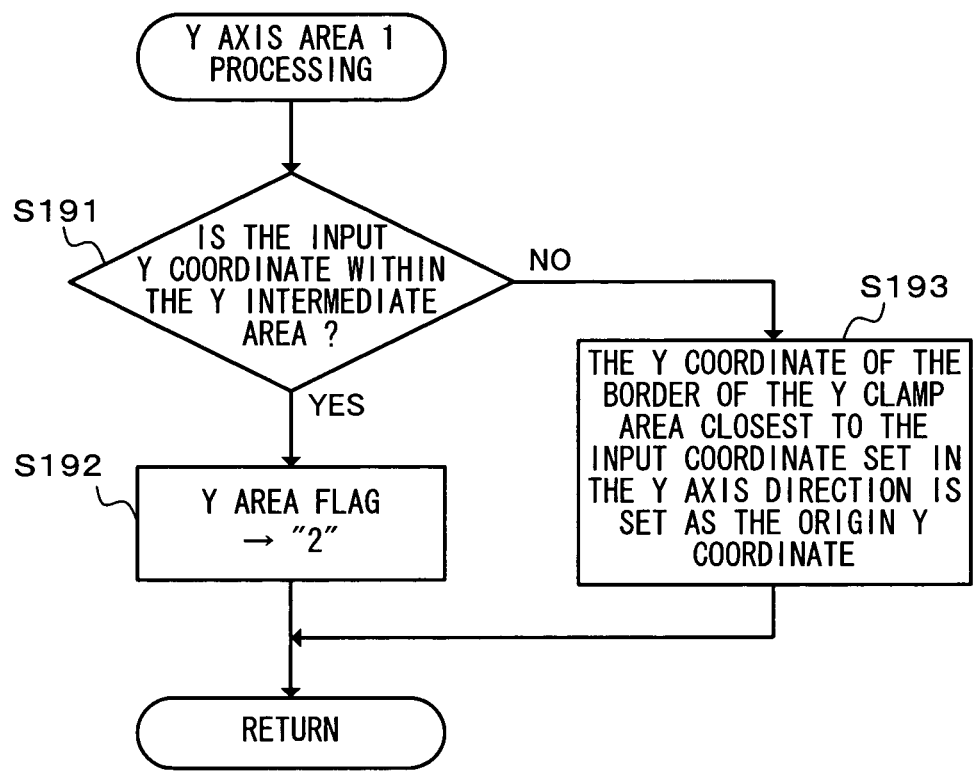
FIG. 28 is a flowchart illustrating Y axis area 1 processing in step S182 in FIG. 27.

FIG. 28 is a flowchart illustrating the Y axis area 1 processing in step S182 in detail. Referring to FIG. 28, the CPU 31 first determines whether or not the input Y coordinate is within the Y intermediate area 204 (step S191). When it is determined that the input Y coordinate is within the Y intermediate area 204 (YES in step S191), "2" is set for the Y area flag (step S192). By contrast, when it is determined that the input Y coordinate is outside the Y intermediate area 204 (NO in step S191), the Y coordinate of the border 107 between the Y clamp area 104 and the Y intermediate area 204, which is the closest border to the input coordinate set in the Y axis direction, is set as the origin Y coordinate (step S193). Thus, the Y axis area 1 processing is terminated.

Figure 29:
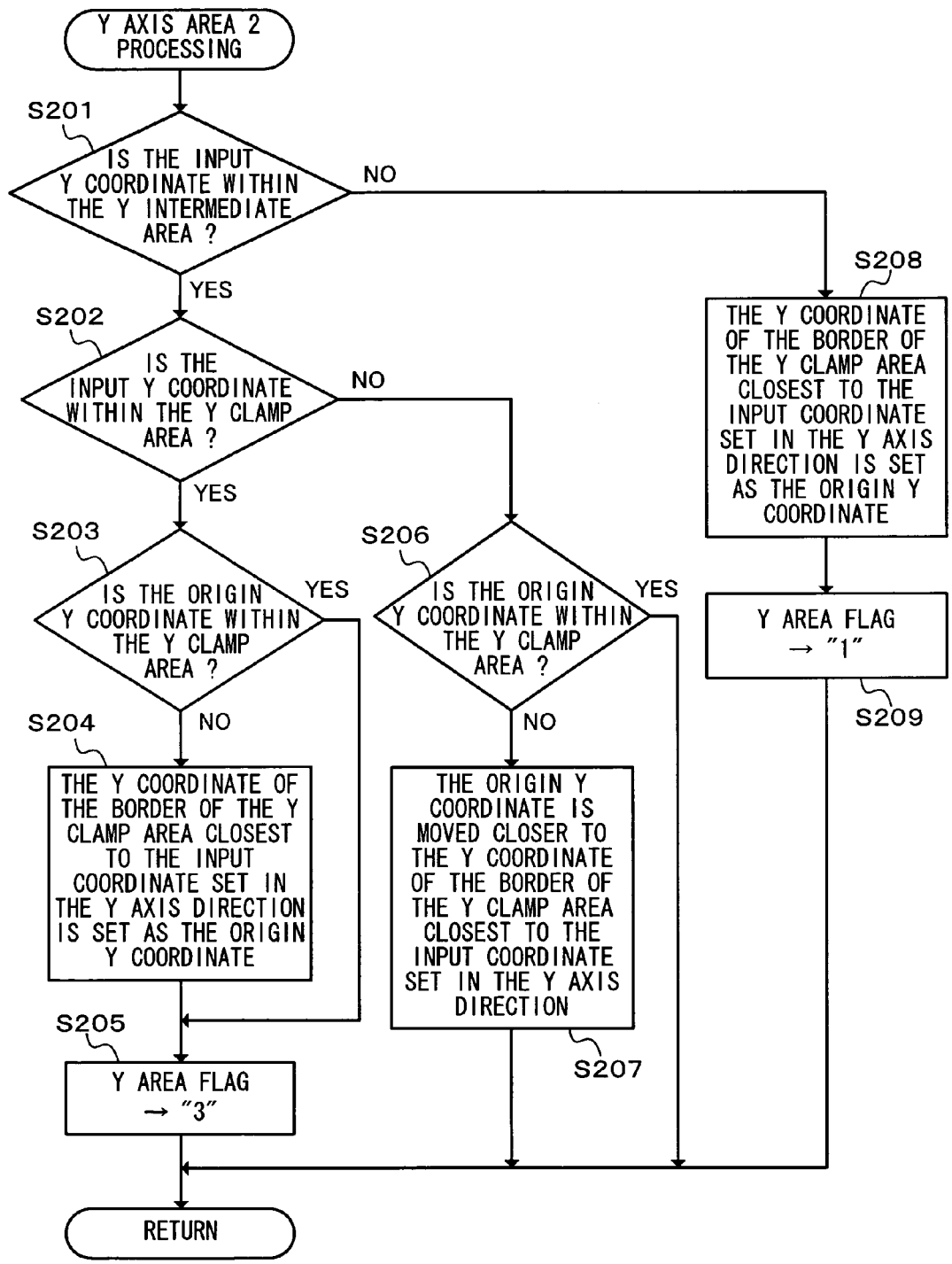
FIG. 29 is a flowchart illustrating Y axis area 2 processing in step S184 in FIG. 27.

FIG. 29 is a flowchart illustrating the Y axis area 2 processing in step S184 in detail. Referring to FIG. 29, the CPU 31 first determines whether or not the input Y coordinate is within the Y intermediate area 204 (step S201). When it is determined that the input Y coordinate is within the Y intermediate area 204 (YES in step S201), it is determined whether or not the input Y coordinate is within the Y clamp area 104 (step S202). When it is determined that the input Y coordinate is within the Y clamp area 104 (YES in step S202), it is determined whether or not the origin Y coordinate is within the Y clamp area 104 (step S203). When it is determined that the origin Y coordinate is outside the Y clamp area 104 (NO in step S203), the Y coordinate of the border of the Y clamp area 104 which is closest to the input coordinate set is set as the origin Y coordinate (step S204). By contrast, when it is determined that the origin Y coordinate is within the Y clamp area 104 (YES in step S203), the processing is advanced to step S205. Namely, the origin Y coordinate is not changed. "3" is set for the Y area flag" (step S205).

By contrast, when it is determined in step S202 that the input Y coordinate is within the Y intermediate area 204 but outside the Y clamp area 104 (NO in step S202), it is determined whether or not the origin Y coordinate is within the Y clamp area 104 (step S206). When it is determined that the origin Y coordinate is outside the Y clamp area 104 (NO in step S206), the value of the origin Y coordinate is made closer to the Y coordinate of the border of the Y clamp area 104 which is closest to the input coordinate set by a predetermined value (step S207), like in step S167. As a result, in the Y intermediate area 204, the origin Y coordinate moves toward the Y coordinate on the border of the Y clamp area 104 as the time passes. Once reaching the border, the origin Y coordinate is not moved further. By contrast, when it is determined in step S206 that the origin Y coordinate is in the Y clamp area 104 (YES in step S206), the Y axis area 2 processing is terminated.

When it is determined in step S201 that the input Y coordinate is outside the Y intermediate area 204 (NO in step S201), the Y coordinate of the border of the Y clamp area 104 which is closest to the input coordinate set is set as the origin Y coordinate (step S208). "1" is set for the Y area flag (step S209). Thus, the Y axis area 2 processing is terminated.

Figure 30:
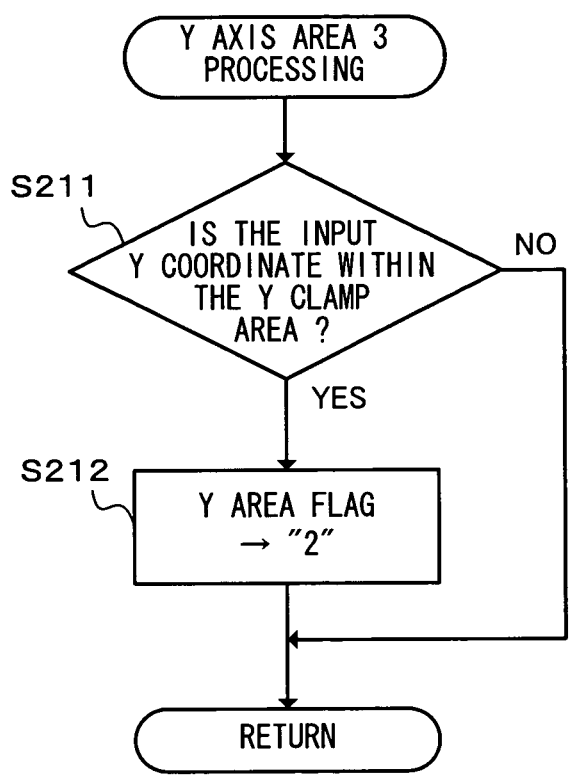
FIG. 30 is a flowchart illustrating Y axis area 3 processing in step S185 in FIG. 27.

FIG. 30 is a flowchart illustrating the Y axis area 3 processing in step S185. Referring to FIG. 30, the CPU 31 determines whether or not the input Y coordinate is within the Y clamp area 104 (step S211). When it is determined that the input Y coordinate is within the Y clamp area 104 (YES in step S211), the Y axis area 3 processing is terminated. By contrast, when it is determined that the input Y coordinate is outside the Y clamp area 104 (NO in step S211), "2" is set for the Y area flag (step S212). Thus, the Y axis area 3 processing is terminated.

As described above, according to the second exemplary embodiment, when a position within the intermediate area is touched, the input coordinate set is set as the origin. However, as time passes, the position of the origin is gradually moved toward the center of the touch panel 16. By moving the position of the origin toward the center, the operability of the game is matched to the sense of balance of humans. Thus, a game with a higher operability can be provided.

Third Exemplary Embodiment

A third exemplary embodiment will be described. In the second exemplary embodiment, when a position within the intermediate area is touched, the input coordinate set is set as the origin. As the time passes, the position of the origin is gradually moved to a position on the border of the clamp area. In the third exemplary embodiment, while a position in the intermediate area is being touched, the origin is kept fixed. When a position outside the intermediate area is touched, the origin is moved to a position on the closest border of the clamp area.

The structure of the game apparatus 10 used in this exemplary embodiment is the same as that described above with reference to FIG. 1 and FIG. 2, and will not be described in detail. The elements of the game apparatus 10 bear the identical reference numerals to those mentioned above.

Game processing according to the third exemplary embodiment will be described in detail. The game processing according to the third exemplary embodiment is basically the same as that according to the second exemplary embodiment described above with reference to FIG. 20 through FIG. 30 except for the following. The flowchart of the X axis area 2 processing is replaced with the flowchart shown in FIG. 31. The flowchart of the Y axis area 2 processing is replaced with the flowchart shown in FIG. 32. Thus, the processing other than that in FIG. 31 and FIG. 32 will not be described in detail.

Figure 31:
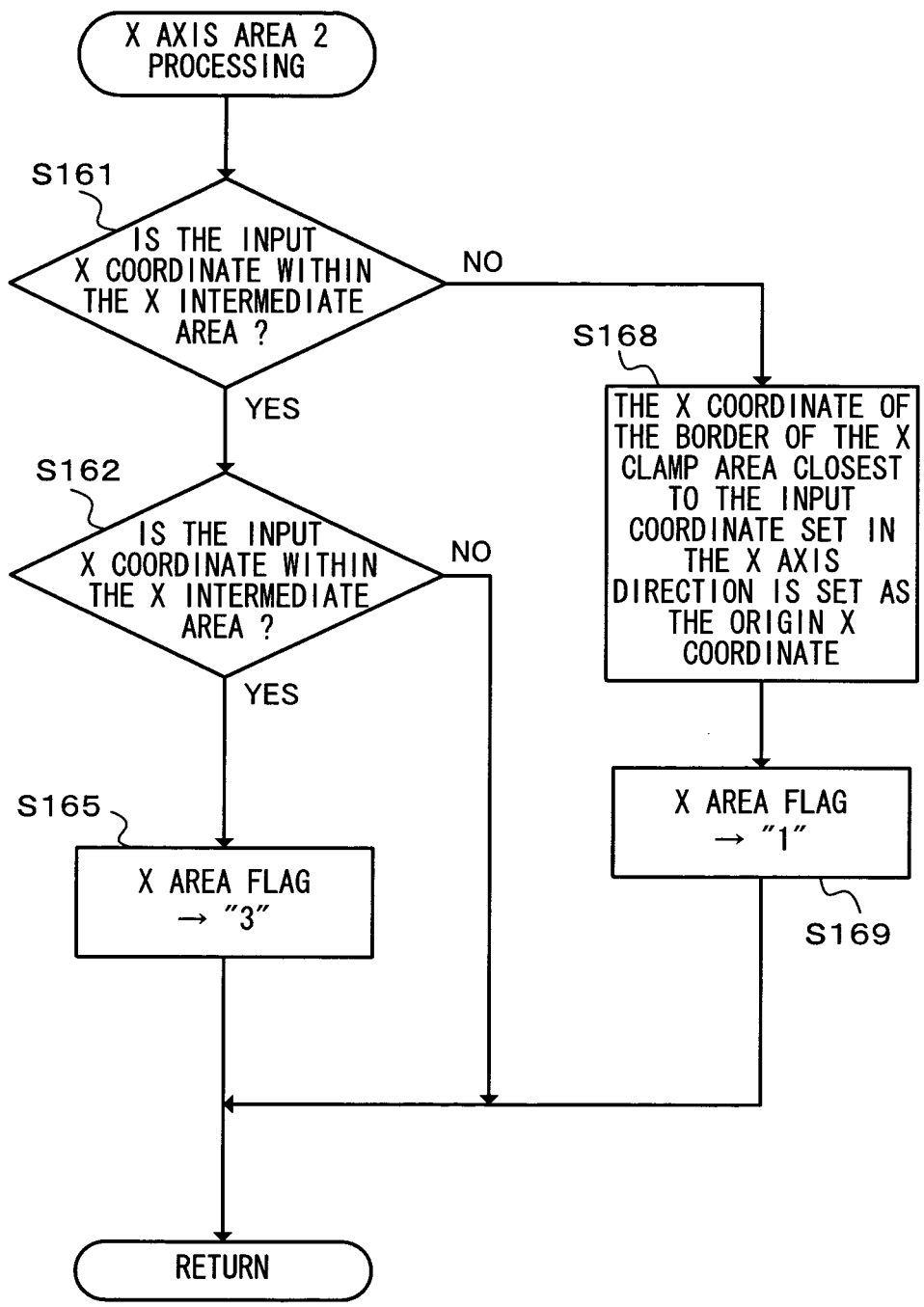
FIG. 31 is a flowchart illustrating X axis area 2 processing according to a third exemplary embodiment.
Figure 32:
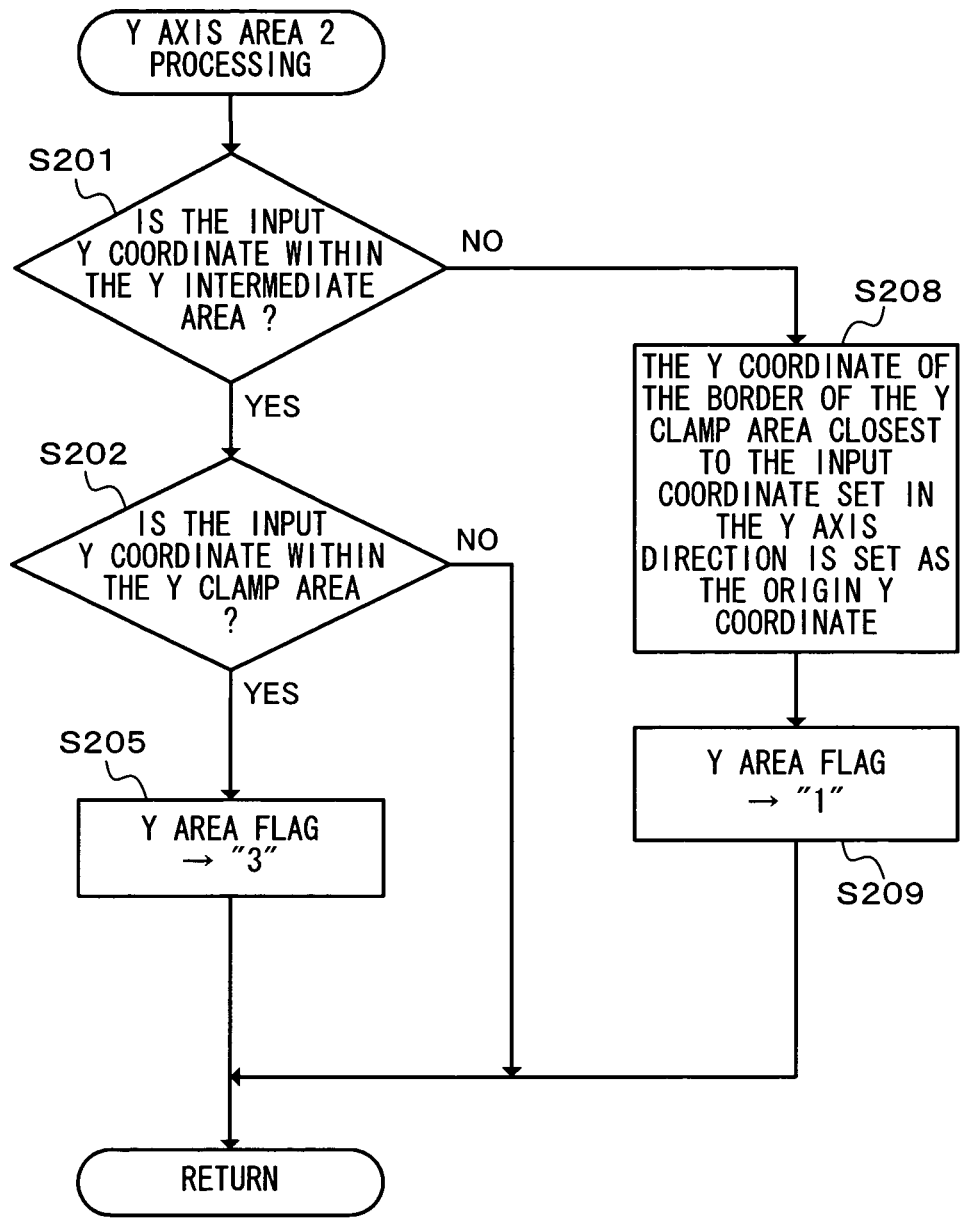
FIG. 32 is a flowchart illustrating Y axis area 2 processing according to the third exemplary embodiment.
Figure 33A:
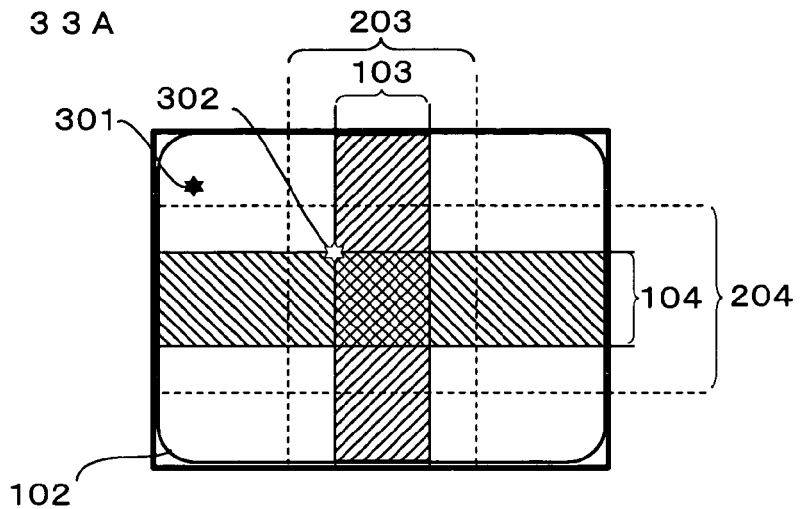
FIG. 33A through FIG. 33C show the relationship between an input coordinate set and the origin in the third exemplary embodiment.
Figure 33B:
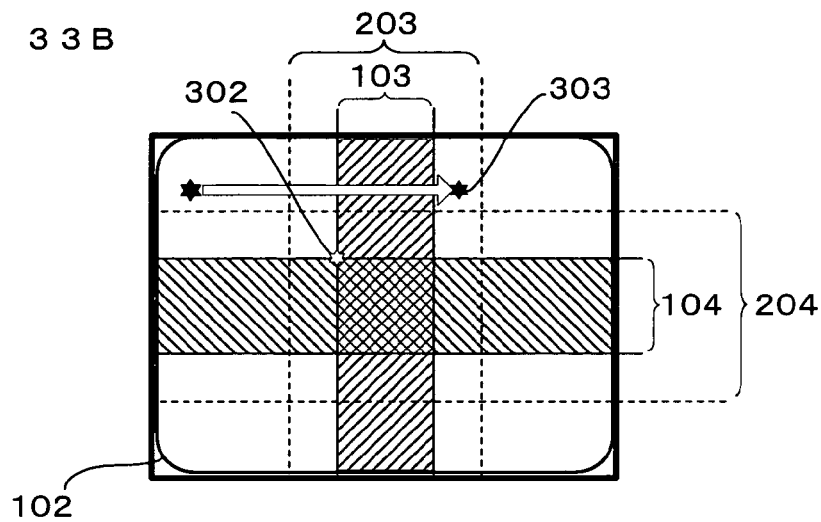
Figure 33C:
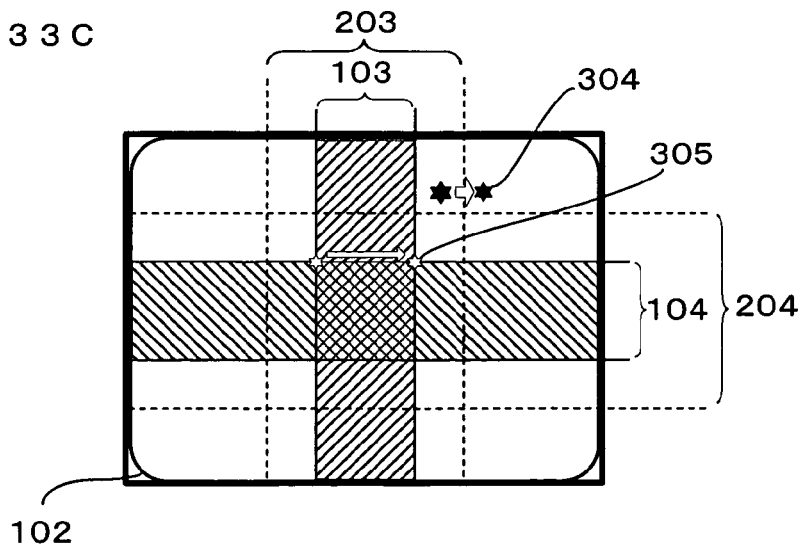

The flowchart shown in FIG. 31 is obtained by deleting the processing in steps S163, S164, S166 and S167 from the X axis area 2 processing shown in FIG. 25. The flowchart shown in FIG. 32 is obtained by deleting the processing in steps S203, S204, S206 and S207 from the Y axis area 2 processing shown in FIG. 29. Namely in the third exemplary embodiment, while the input X coordinate is in the X intermediate area 203, the position of the origin X coordinate is not changed. When the input X coordinate goes outside the X intermediate area 203, the X coordinate of the border between the X intermediate area 203 and the X clamp area 103, which is the closest border to the input coordinate set in the X axis direction, is set as the origin X coordinate. Substantially the same processing is executed for the Y coordinate. By such processing, the relationship between the input coordinate set and the origin coordinate set is as shown in FIG. 33A through FIG. 33C. FIG. 33A through FIG. 33C illustrate the relationship between the input coordinate set and the origin coordinate set in the third exemplary embodiment. In FIG. 33A through FIG. 33C, the intermediate areas 203 and 204 are defined like in the second exemplary embodiment. When, for example, the player touches a point 301 shown in FIG. 33A with his/her finger, a point 302 is set as the origin. Then, the player is assumed to slide his/her finger rightward in a horizontal direction while touching the touch panel 16. Even when the finger moves to a point 303 in the intermediate area 203 as shown in FIG. 33B, the position of the origin is not changed. When the finger moves to a point 304 outside the intermediate area 203 as shown in FIG. 33C, a point 305 is set as the origin.

As described above, according to the third exemplary embodiment, while a position in the intermediate area is being touched, the position of the origin is fixed. When a position outside the intermediate area is touched, the origin is moved to the border of the clamp area closest to the touch position. Therefore, the area in which the origin is fixed is not limited to the clamp area and can be adjusted by appropriately setting the size of the intermediate area. As a result, the operability of the game can be adjusted more precisely in accordance with the type or content of the game.

In the above exemplary embodiments, a mobile game apparatus including two display devices are described as an example. Certain exemplary embodiments are also applicable to a mobile terminal including a single display device having a touch panel on a screen thereof. In the above exemplary embodiments, the touch panel is used as a device for detecting the position in the operation region indicated by the player. The device may be any so-called pointing device for allowing the player to indicate a position within a predetermined region. The device may be, for example, a mouse capable of indicating an arbitrary position on the screen, or a tablet for indicating an arbitrary position on the operation screen with no display screen. The device may be a pointing device for calculating a coordinate set on the display screen corresponding to the indicated position on the display screen, based on the position of the display screen or the marker in an image which is taken when a device, including imaging means for taking an image of the display screen or the marker provided in the vicinity of the display screen from a remote location, is pointed to the display screen.

While certain exemplary embodiments have been described in detail, the foregoing description is in all aspects illustrative and not restrictive. It is understood that numerous other modifications and variations can be devised without departing from the scope of the certain exemplary embodiments.

What is claimed is:

1. An object processing apparatus for executing processing on an object in a virtual space based on an indicated coordinate set corresponding to a position in an operation region indicated by a player, wherein:
   the operation region is defined as being divided into at least two types of areas of a first area and a second area bordering on the first area; and
   the object processing apparatus comprises:
   an indicated coordinate set detection section for detecting the indicated coordinate set;
   an indicated coordinate set determination section for determining whether the indicated coordinate set is encompassed in the first area or the second area;
   a reference coordinate set setting section for, when the indicated coordinate set is determined to be encompassed in the first area, setting the indicated coordinate set as a reference coordinate set, and when the indicated coordinate set is determined to be encompassed in the second area, setting a predetermined coordinate set closer to the first area than the indicated coordinate set as the reference coordinate set; and
   an operation control section for controlling an operation on the object in the virtual space based on a positional relationship between the reference coordinate set and the indicated coordinate set.

2. An object processing apparatus according to claim 1, wherein the operation control section controls an operation on the object based on at least one of a direction and a distance both determined by the positional relationship between the reference coordinate set and the indicated coordinate set.

3. An object processing apparatus according to claim 2, wherein the operation control section controls a moving direction of the object to be a direction determined by the positional relationship between the reference coordinate set and the indicated coordinate set.

4. An object processing apparatus according to claim 2, wherein the operation control section controls a moving speed of the object based on a moving speed in accordance with the distance determined by the positional relationship between the reference coordinate set and the indicated coordinate set.

5. An object processing apparatus according to claim 1, wherein when the indicated coordinate set is determined to be encompassed in the second area, the reference coordinate set setting section sets a coordinate set among coordinate sets on a border between the first area and the second area as the reference coordinate set.

6. An object processing apparatus according to claim 5, wherein the reference coordinate set setting section sets a coordinate set among the coordinate sets on the border which is closest to the indicated coordinate set as the reference coordinate set.

7. An object processing apparatus according to claim 1, wherein the first area encompasses a central area of the operation region.

8. An object processing apparatus according to claim 1, wherein in the case where indicated coordinate sets are continuously detected by the indicated coordinate set detection section as time passes after the reference coordinate set is set by the reference coordinate set setting section, the reference coordinate set setting section sets a reference coordinate set which is set at the start of the time duration in which the indicated coordinate sets are continuously detected as a new reference coordinate set, regardless of the determination result by the indicated coordinate set determination section.

9. An object processing apparatus according to claim 1, wherein in the case where indicated coordinate sets are continuously detected by the indicated coordinate set detection section as time passes after the reference coordinate set is set by the reference coordinate set setting section, when the indicated coordinate set is encompassed in the first area, the reference coordinate set setting section does not change the position of the reference coordinate set, and when the indicated coordinate set is encompassed in the second area, the reference coordinate set setting section sets a predetermined coordinate set closer to the first area than the indicated coordinate set as the reference coordinate set.

10. An object processing apparatus according to claim 1, wherein:
   the operation region is defined as including a third area encompassing the first area;
   in the case where indicated coordinate sets are continuously detected by the indicated coordinate set detection section as time passes after the reference coordinate set is set by the reference coordinate set setting section, the indicated coordinate set determination section further determines whether or not the indicated coordinate set has gone outside the third area; and
   when the indicated coordinate set is determined not to have gone outside the third area, the reference coordinate set setting section does not change the position of the reference coordinate set, and when the indicated coordinate set is determined to have gone outside the third area, the reference coordinate set setting section sets the predetermined coordinate set closer to the first area than the indicated coordinate set as the reference coordinate set.

11. An object processing apparatus according to claim 1, wherein:
the second area is defined as encompassing a fourth area bordering on the first area; and
the object processing apparatus further comprises a reference coordinate set moving section for, when the reference coordinate set is encompassed in the fourth area and indicated coordinate sets are continuously detected by the indicated coordinate set detection section as time passes, changing the position of the reference coordinate set such that the reference coordinate set becomes gradually closer toward the center of the operation region as time passes.

12. A non-transitory storage medium having stored thereon an object processing program executable by a computer of an object processing apparatus for executing processing on an object in a virtual space based on an indicated coordinate set corresponding to a position in an operation region indicated by a player, wherein:
the operation region is defined as being divided into at least two types of areas of a first area and a second area bordering on the first area; and
the object processing program causes the computer to execute:
detecting the indicated coordinate set;
determining whether the indicated coordinate set is encompassed in the first area or the second area;
setting the indicated coordinate set as a reference coordinate set when the indicated coordinate set is determined to be encompassed in the first area, and when the indicated coordinate set is determined to be encompassed in the second area, setting a predetermined coordinate set closer to the first area than the indicated coordinate set as the reference coordinate set; and
controlling an operation on the object in the virtual space based on a positional relationship between the reference coordinate set and the indicated coordinate set.

13. A non-transitory storage medium according to claim 12, wherein the operation control step controls an operation on the object based on at least one of a direction and a distance both determined by the positional relationship between the reference coordinate set and the indicated coordinate set.

14. A non-transitory storage medium according to claim 13, wherein the operation control step controls a moving direction of the object to be a direction determined by the positional relationship between the reference coordinate set and the indicated coordinate set.

15. A non-transitory storage medium according to claim 13, wherein the operation control step controls a moving speed of the object based on a moving speed in accordance with the distance determined by the positional relationship between the reference coordinate set and the indicated coordinate set.

16. A non-transitory storage medium according to claim 12, wherein when the indicated coordinate set is determined to be encompassed in the second area, the reference coordinate set setting step sets a coordinate set among coordinate sets on a border between the first area and the second area as the reference coordinate set.

17. A non-transitory storage medium according to claim 16, wherein the reference coordinate set setting step sets a coordinate set among the coordinate sets on the border which is closest to the indicated coordinate set as the reference coordinate set.

18. A non-transitory storage medium according to claim 12, wherein the first area encompasses a central area of the operation region.

19. A non-transitory storage medium according to claim 12, further comprising, in the case where indicated coordinate sets are continuously detected as time passes after the reference coordinate set is set setting a reference coordinate set which is set at the start of the time duration in which the indicated coordinate sets are continuously detected as a new reference coordinate set, regardless of whether the indicated coordinate set is encompassed in the first area or the second area.

20. A non-transitory storage medium according to claim 12, wherein in the case where indicated coordinate sets are continuously detected by the indicated coordinate set detection step as time passes after the reference coordinate set is set by the reference coordinate set setting step, when the indicated coordinate set is encompassed in the first area, the reference coordinate set setting step does not change the position of the reference coordinate set, and when the indicated coordinate set is encompassed in the second area, the reference coordinate set setting step sets a predetermined coordinate set closer to the first area than the indicated coordinate set as the reference coordinate set.

21. A non-transitory storage medium according to claim 12, wherein:
the operation region is defined as including a third area encompassing the first area;
in the case where indicated coordinate sets are continuously detected as time passes after the reference coordinate set is set it is determined whether or not the indicated coordinate set has gone outside the third area; and
when the indicated coordinate set is determined not to have gone outside the third area, the position of the reference coordinate set is not changed, and when the indicated coordinate set is determined to have gone outside the third area, the predetermined coordinate set is set closer to the first area than the indicated coordinate set as the reference coordinate set.

22. A non-transitory storage medium according to claim 12, wherein:
the second area is defined as encompassing a fourth area bordering on the first area; and
the object processing program causes the computer to further execute a reference coordinate set moving step of, when the reference coordinate set is encompassed in the fourth area and indicated coordinate sets are continuously detected by the indicated coordinate set detection step as time passes, changing the position of the reference coordinate set such that the reference coordinate set becomes gradually closer toward the center of the operation region as time passes.

* * * * *